US007551187B2

(12) United States Patent
Agrawala et al.

(10) Patent No.: US 7,551,187 B2
(45) Date of Patent: Jun. 23, 2009

(54) SYSTEMS AND METHODS THAT UTILIZE A DYNAMIC DIGITAL ZOOMING INTERFACE IN CONNECTION WITH DIGITAL INKING

(75) Inventors: Maneesh Agrawala, Seattle, WA (US); Michael Shilman, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 662 days.

(21) Appl. No.: 10/775,710

(22) Filed: Feb. 10, 2004

(65) Prior Publication Data

US 2005/0177783 A1    Aug. 11, 2005

(51) Int. Cl.
G09G 5/00 (2006.01)
G06F 17/00 (2006.01)
G06F 17/20 (2006.01)

(52) U.S. Cl. .................. 345/667; 345/660; 345/661; 715/203

(58) Field of Classification Search .......... 345/629, 345/667; 715/512, 203
See application file for complete search history.

(56) References Cited

U.S. PATENT DOCUMENTS

| | | | |
|---|---|---|---|
| 5,778,403 A | 7/1998 | Bangs | |
| 5,940,077 A | 8/1999 | Amro | |
| 6,011,551 A | 1/2000 | Amro | |
| 6,201,384 B1* | 3/2001 | Alexander | 324/121 R |
| 6,230,169 B1* | 5/2001 | Nagae | 715/512 |
| 6,256,009 B1 | 7/2001 | Lui et al. | |
| 6,326,957 B1 | 12/2001 | Nathan et al. | |
| 6,552,719 B2 | 4/2003 | Lui et al. | |
| 6,584,479 B2* | 6/2003 | Chang et al. | 715/512 |
| 6,762,777 B2* | 7/2004 | Carroll | 715/808 |
| 2001/0043716 A1* | 11/2001 | Price et al. | 382/100 |
| 2002/0116420 A1* | 8/2002 | Allam et al. | 707/526 |
| 2003/0070139 A1* | 4/2003 | Marshall et al. | 715/512 |

OTHER PUBLICATIONS

N. O. Bouvin et al., "Fluid Annotations Through Open Hypermedia: Using and Extending Emerging Web Standards", Proceedings of the 11th international conference on World Wide Web, May 7-11, 2002, Honolulu, Hawaii, pp. 160-171.*
K. Knudtzon et al., "An Annotation Support System for Middle School Teachers and Students in the ICDL", University of Maryland, College Park, MD, pp. 1-9, https://www.cs.umd.edu/class/spring2003/cmsc838g-0101/StudentPapers/ICDL.pdf.*

(Continued)

Primary Examiner—Jin-Cheng Wang
(74) Attorney, Agent, or Firm—Lee & Hayes, PLLC

(57) ABSTRACT

The present invention relates to systems and methods that facilitate annotating digital documents (e.g., digital inking) with devices such as Tablet PCs, PDAs, cell phones, and the like. The systems and methods provide for multi-scale navigation during document annotating via a space-scale framework that fluidly generates and moves a zoom region relative to a document and writing utensil. A user can employ this zoom region to annotate various portions of the document at a size comfortable to the user and suitably scaled to the device display. The space-scale framework enables dynamic navigation, wherein the zoom region location, size, and shape, for example, can automatically adjust as the user annotates. When the user finishes annotating the document, the annotations scale back with the zoom region to original page size. These novel features provide advantages over conventional techniques that do not contemplate multi-scale navigation during document annotating.

20 Claims, 22 Drawing Sheets

OTHER PUBLICATIONS

M. Gotze, S. Schlechtweg, T. Strothotte. The Intellingent Pen-Toward a Uniform Treatment of Electronic Documents. In Proc. of the 2nd International Symposium on Smart Graphics, pp. 129-135, ACM Press, 2002.

T. Igarashi and K. Hinckley. Speed-Dependent Automatic Zooming for Browsing Large Documents. In Proc. the ACM Symposium on User Interface Software and Technology, pp. 139-148, ACM Press, 2000.

J.I. Hong and J.A. Landay. SATIN: A Toolkit for Informal Ink-based Applications. ACM Symposium on User Interface Software and Technology, CHI Letters, 2000. 10 pages.

G. Golovchinsky, M.N. Price, and B.N. Schilit. From reading to retrieval: freeform ink annotations as queries, in Proceedings of SIGIR '99. ACM Press, pp. 19-25, 1999.

B.N. Schilit, G. Golovchinsky, and M.N.Price. Beyond paper: supporting active reading with free form digital ink annotations, in Proceedings of CHI98, ACM Press, pp. 249-256, 1998.

G. Golochinsky and L. Denoue. Moving markup: repositioning freeform annotations. Proceedings of UIST'02, pp. 21-30, 2002.

G.G. Robertson, J.D. Mackinlay, and S.K. Card. The perspective wall: Detail and context smoothly integrated. CHI '91 Conference Proceedings, pp. 174-179, 1991.

G. Robertson and J. D. Mackinlay. The document lens. In Proceedings of the ACM Symposium on User Interface Software and Technology (UIST'93), pp. 101-108, 1993.

R. Rao and S. K. Card. The Table Lens: Merging graphical and symbolic representations in an interactive focus + context visualization for tabular information. In Proceedings of the ACM Conference on Human Factors in Computing Systems (CHI'94), pp. 318-322, 1994.

B.B. Bederson, A. Clamage, M.P. Czerwinski, and G.G. Robertson. A Fisheye Calendar Interface for PDAs: Providing Overviews for Small Displays. HCIL Tech Report #HCIL-Sep. 2002(2002). 9 pages.

G.W. Furnas and B.B. Bederson. Space-scale diagrams: Understanding Multiscale Interfaces. Proc. CHI '95, pp. 234-241, 1995.

G.W. Furnas and X. Zhang. MuSE: A Multiscale Editor. In Proceedings of ACM UIST'98, pp. 107-116.

S. Jul and G. W. Furnas. Critical zones in desert fog: Aids to multiscale navigation. In Proceedings of the ACM Symposium on User Interface Software and Technology, 1998. 10 pages.

E.A. Bier, M.C. Stone, K. Pier, W. Buxton, and T.D. Derose. Toolglass and Magic Lenses: The See-Through Interface. In ACM Computer Graphics Proceedings, Aug. 1993, pp. 73-80.

K. Perlin and D. Fox. Pad: An alternative approach to the computer interface. In ACM SIGGRAPH'93 Conference Proceedings, pp. 57-64, 1993.

B. Bedersen and J. Hollan. Pad++: A Zooming Graphical Interface for Exploring Alternate Interface Physics, Proc. UIST 94, ACM, pp. 17-26, 1994.

B.B. Bederson, J. Meyer, and L. Good. Jazz: An Extensible Zoomable User Interface Graphics Toolkit in Java. Proceedings of the 13th annual ACM UIST, pp. 171-180, 2000.

L. Good and B.B. Bederson. Zoomable User Interfaces as a Medium for Slide Show Presentations. Information Visualization, vol. 1, Issue 1, pp. 35-49, 2002.

J. Subrahmonia and T. Zimmerman. Pen Computing: Challenges and Applications. Proc. International Conference on Pattern Recognition, pp. 60-66, 2000.

G.W. Furnas. Generalized Fisheye Views. Proc. CHI 86, pp. 16-23, 1986.

R.C. Davis, J.A. Landay, V. Chen, J. Huang, R.B. Lee, F. Li, J. Lin, C.B. Morrey, B. Schleimer, M.N. Price, and B.N. Schilit. NotePals: Lightweight Note Sharing by the Group for the Group. Proc. CHI 99, pp. 338-345, 1999.

D. Bargeron and T. Moscovich. Reflowing Digital Ink Annotations. Proc. CHI 03, pp. 385-393, 2003.

Ronald E. Anderson, Social Impacts of Computing: Codes of Professional Ethics, Social Science Computer Review 10:4, Winter 1992, pp. 453-469.

Giovanni Seni, Treadmill Ink—Enabling Continuous Pen Imput on Small Devices, Computer Society, 6 pages, 2002.

As We May Read: The Reading Appliance Revolution, Jan. 1999, pp. 65-73.

* cited by examiner

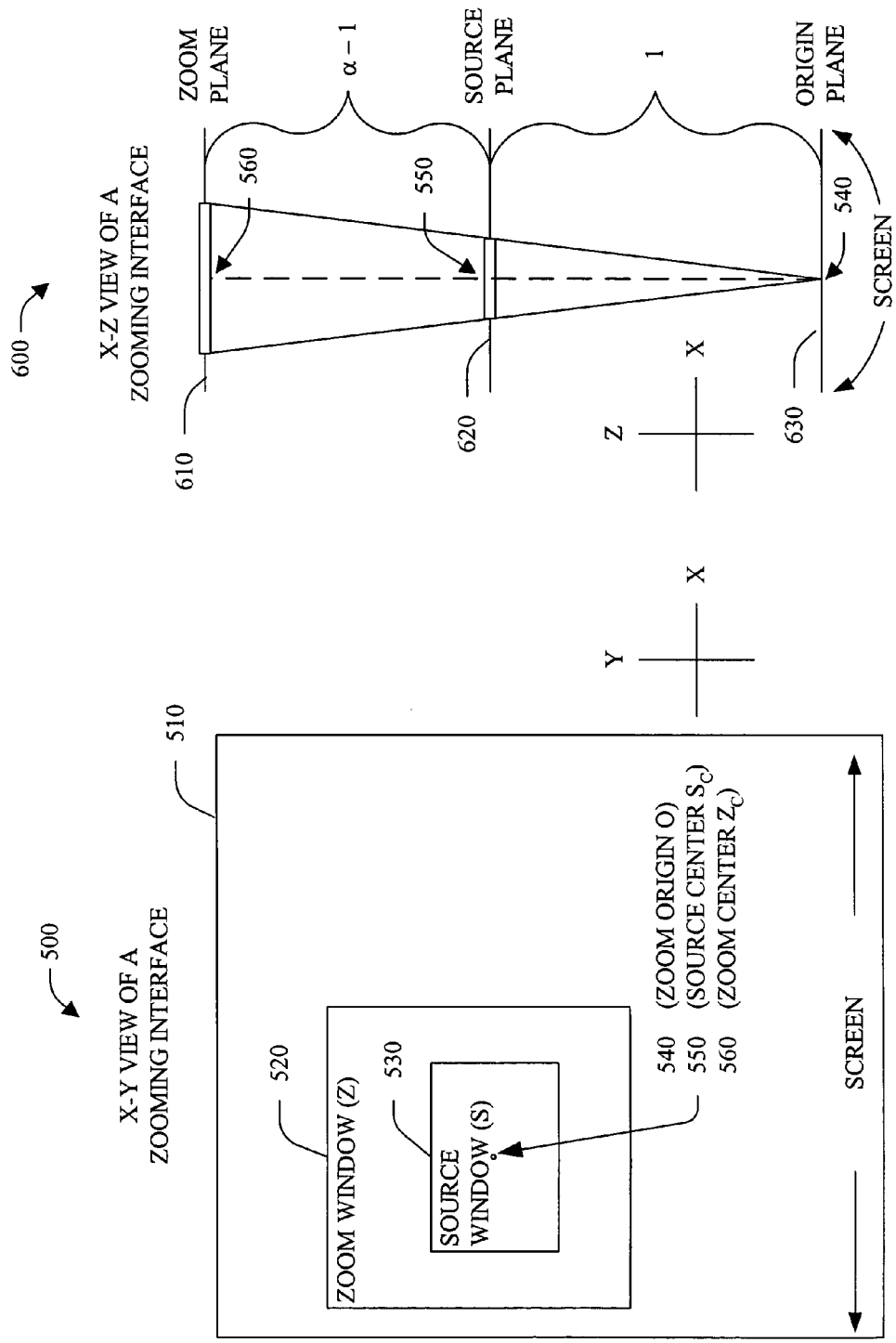

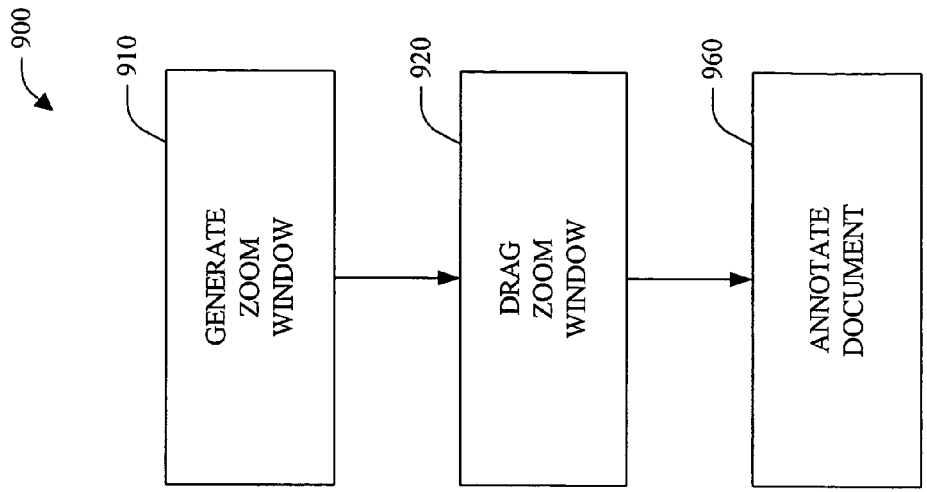
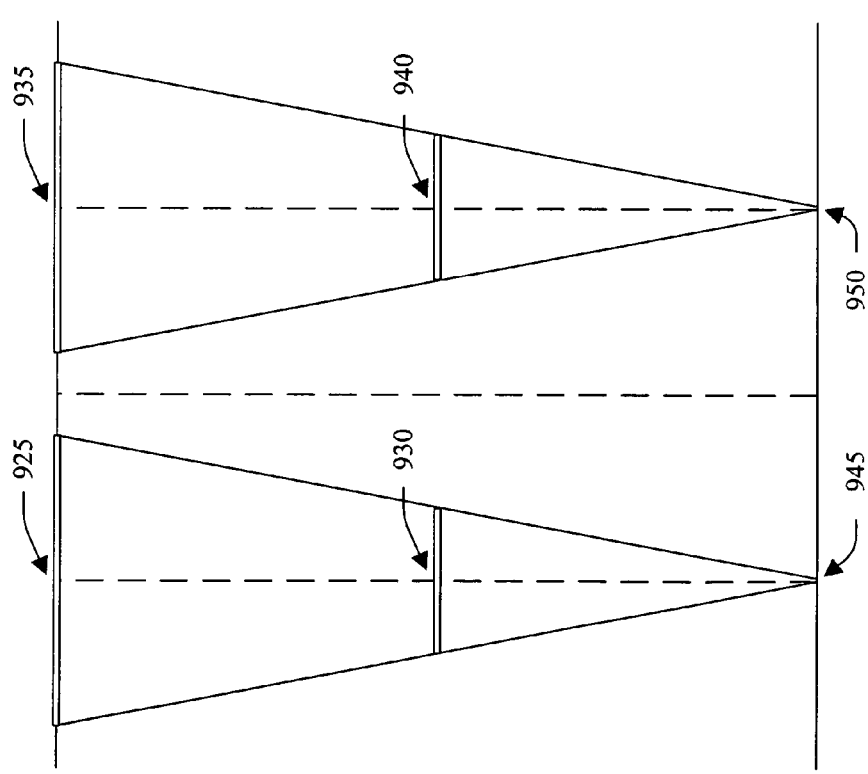
FIG. 9

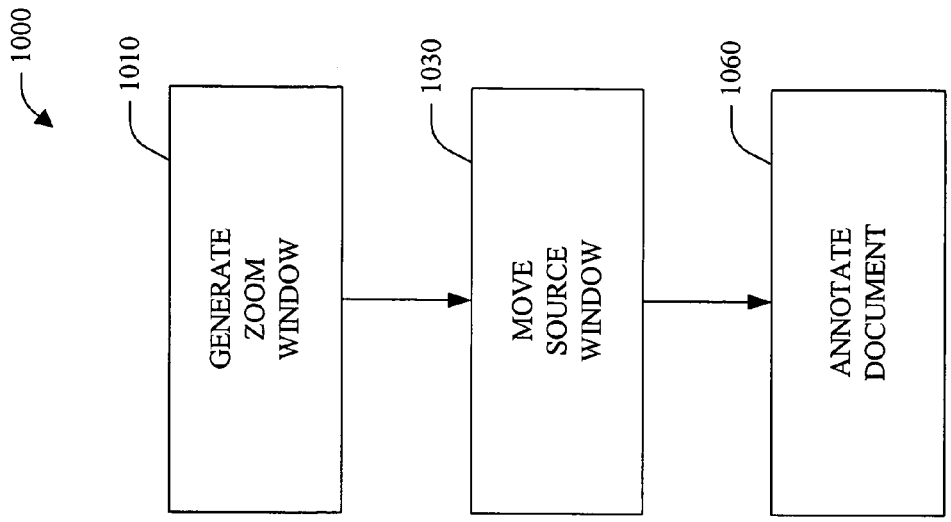
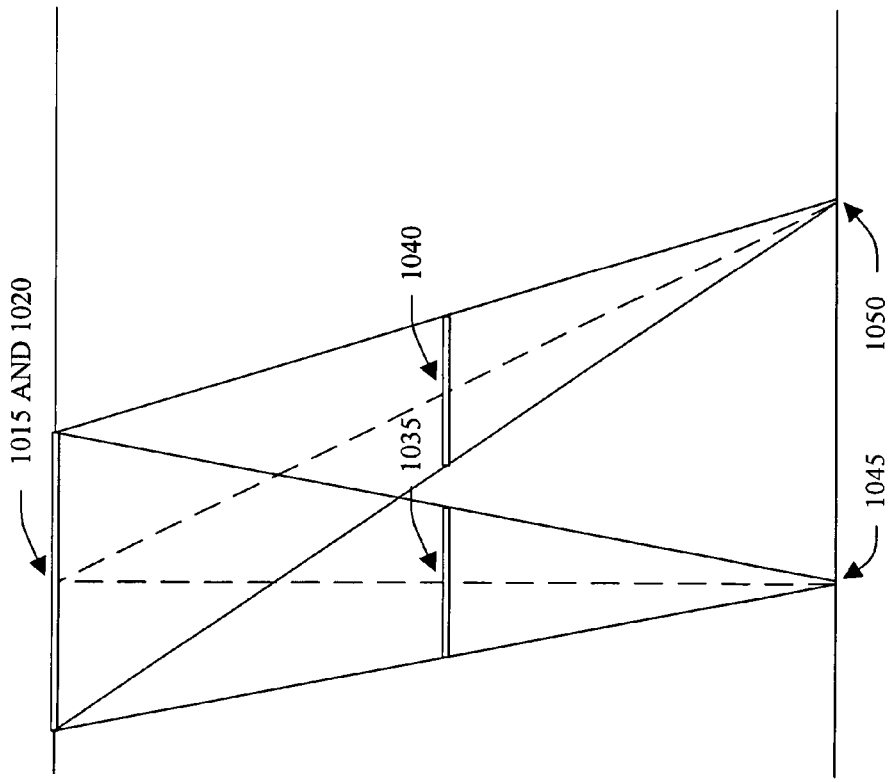
FIG. 10

SYSTEMS AND METHODS THAT UTILIZE A DYNAMIC DIGITAL ZOOMING INTERFACE IN CONNECTION WITH DIGITAL INKING

TECHNICAL FIELD

The present invention generally relates to digital document annotating, and more particularly to systems and methods that employ a zoom window that facilitates multi-scale navigation during free form digital inking of a document.

BACKGROUND OF THE INVENTION

Graphical user interfaces (GUIs) are commonly employed in connection with microprocessor-based computing devices to edit digital documents (e.g., word processing documents, images, etc.). Many of these computing devices (e.g., Tablet PCs, PDAs, cell phones and the like) attempt to provide a natural and expressive way to annotate documents with free form digital ink via a digital pen, mouse, etc. Ideally, utilizing such devices should feel like writing on physical paper, and the resulting annotation should appear similar to its ink counterpart. Thus, a goal of such computing devices is to provide a surface that emulates physical paper.

However, a variety of ergonomic factors make it difficult to fully achieve this goal. Examples of such factors include: slip; resolution; screen size; parallax; and device size and weight. Slip generally refers to the fact that pen-computing devices tend to be more slippery than real paper. Resolution takes into account that digital screens have less visual resolution than paper. In addition, digitizers usually track digital pens at lower resolution than the finest human hand movements. Parallax is a consequence of providing a protective layer of plastic over the screen, wherein the protective layer creates an apparent displacement between the tip of the digital pen and underlying document. Size and weight, including screen size, reflects design considerations for portable devices that result in devices and screens that are often smaller than standard letter-size paper and more difficult to position and interact with.

While hardware designers continue to improve pen-based devices to make them feel more like paper, a substantial gap remains. Many limitations associated with these devices force users to change the way in which they interact with such devices and annotations often end up appearing very different from ink on paper. In particular, screens associated with such computing devices are usually smaller than a sheet of paper. Conventional techniques for fitting at least a portion of a page within a screen include adjusting the display resolution and/or "zoom." However, these techniques involve scaling down text and/or graphics, which can render the document information unreadable. In addition, many devices can be hardware and/or software limited such that selecting a higher resolution is not an option. Another problem with scaling down text and/or graphics is that the user typically ends up annotating at a much larger size than they would on paper. The large size of the ink generally results in annotations that are less dense than real ink annotations on paper, consume limited screen real estate, obscure the underlying document, and appear clumsy.

Conventional techniques that attempt to address writing scale versus display scale fail to emulate physical paper. For example, in many of these techniques, the user specifies a focus cursor in a main overview area at the top of the screen. Then, the user writes in a focus area at the bottom of the screen, wherein the annotations are reduced to a predefined percentage (e.g., 40%) of the original size and placed at the focus cursor. Upon filling the focus area, the user typically is required to perform a right to left movement in the focus area in order to move the focus cursor forward. With other techniques, the focus area constantly scrolls from right to left, thereby continuously clearing space for new annotations. Still with other techniques, the user is required to explicitly create new writing space when filling the focus area, which can break the flow of writing, or modify their writing style to work with the continuous scrolling writing area.

Conventional techniques that employ zooming usually magnify a region of interest within an image or document such that the surrounding context is not visible after the zoom. Navigating in the zoomed view typically requires scrolling, which can be tedious when the magnification factor is high. Other approaches include a multi-scale view of the document, in which a magnified focus region shows details while the surrounding context remains visible. Navigation through the document is typically achieved by positioning a focus region (or lens) over the underlying document, for example, via panning and/or zooming. Although many conventional techniques attempt to provide a natural and expressive way to annotate documents and images with freeform digital ink (via a digital pen, mouse, etc.) these techniques do not overcome the aforementioned problems with annotating on small-screen devices like Tablets PCs, PDAs, cell phones and the like and fail to emulate writing on physical paper.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides a focus plus context-based interface that facilitates multi-scale navigation during digital document (e.g., word processing documents, images, etc.) annotating by microprocessor-based devices (e.g., desktop computers, Tablet PCs, PDAs and cell phones) with tools such as a digital pen, a mouse, etc. The systems and methods of the present invention provide an interface that zooms a region of an underlying document, wherein a user can enter annotations in the region at a size comfortable to the user and suitably scaled to the device display. This region can automatically adjust (e.g., location, size, shape, etc.), as needed, while the user annotates. When the zoom region is reduced back to the normal page size, the digital ink annotations scale to an appropriate size, based on the underlying document.

The systems and methods of the present invention build upon free-form digital ink and zoomable user interfaces to provide a mobile zoom region that can be variously configured to automatically grow and/or move and only cover a subset of the screen so that a user can see the overall context of the underlying document, if desired. This novel feature provides advantages over conventional techniques that do not contemplate multi-scale navigation during document annotating. The subject invention employs various techniques based on a scale-space framework in order to fluidly place and move the zoom region with respect to the underlying document and the user's writing tool. These techniques enable quick and easy digital document annotation, wherein the resulting annotations closely mimic the look and feel of annotations on physical paper.

In one aspect of the present invention, a system that facilitates document annotation within microprocessor-based devices is illustrated. The system comprises an annotation management component that generates annotation regions and an annotation configuration component that provides annotation region properties that are employed to generate the annotation regions. The annotation management component can be invoked to generate an annotation region from a user interface via an action, a sound, and/or automatically. The annotation management component can obtain annotation region configurations from an annotation configuration component and/or from the user or intelligence components. Such configuration information can define annotation region size, shape, location, appearance, etc., as well as navigation characteristics.

The annotation region can be generated to occupy at least a subset of the viewing area and be positioned proximate an area of interest such that the user is provided with ample space to view document information and add annotations within the annotation region, as well as continue to view remaining portions of non-scaled document information. In addition, the annotation region typically scales the document information residing therein so that the user can comfortably add annotations that are relatively similar in size to the document information. The system further comprises a navigation component that provides navigation algorithms. As needed, the annotation region can be re-positioned and/or re-shaped via the algorithms to enable the user to add annotations essentially anywhere on the document. When the annotation region is closed, the document information can be scaled back to its original size and the annotations can be scaled by a similar factor or a different factor, depending on the properties provided by the annotation configuration.

In another aspect of the present invention, a methodology that facilitates annotating a digital document is illustrated. The methodology comprises activating a zoomable user interface, or zoom window, for example, with a digital pen via tapping at a point on a display. The zoom window can be generated proximate this point and can provide a magnified view of the document lying below the zoom window. Animation can be employed to generate this zoom window. After the zoom window is generated, a user can annotate the underlying document via the zoom window, for example, by writing within the zoom window. The zoom window can be utilized to annotate various regions of the document by moving the zoom window to desired locations prior to and during annotating the document. The user can close the zoom window, wherein document content as well as the annotations can scale to a size consonant with the underlying document.

In yet other aspects of the present invention, document annotation methodologies based on a space-scale framework are illustrated. The methodologies are utilized to position and navigate a zoom window while annotating a document. In one instance, the zoom window automatically adjusts, as needed, to provide the user with seamless and unobstructed annotation capabilities. In another instance, the document is moved relative to the zoom window. In yet another instance, the zoom window is moved relative to the underlying document.

Other aspects of the present invention illustrate annotation systems that employ intelligence to facilitate generation and management of a zoom window, examples of documents annotated with the novel aspects of the present invention, and various shapes that can be employed in accordance with aspects of the present invention. Moreover, environments are illustrated wherein the novel aspects of the present invention can be employed.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 5 illustrates an exemplary two-dimensional schematic associated with a space-scale framework.

FIG. 6 illustrates an exemplary one-dimensional diagram associated with a space-scale framework.

FIG. 9 illustrates a first exemplary annotation methodology.

FIG. 10 illustrates a second exemplary annotation methodology.

DETAILED DESCRIPTION OF THE INVENTION

Figure 1:
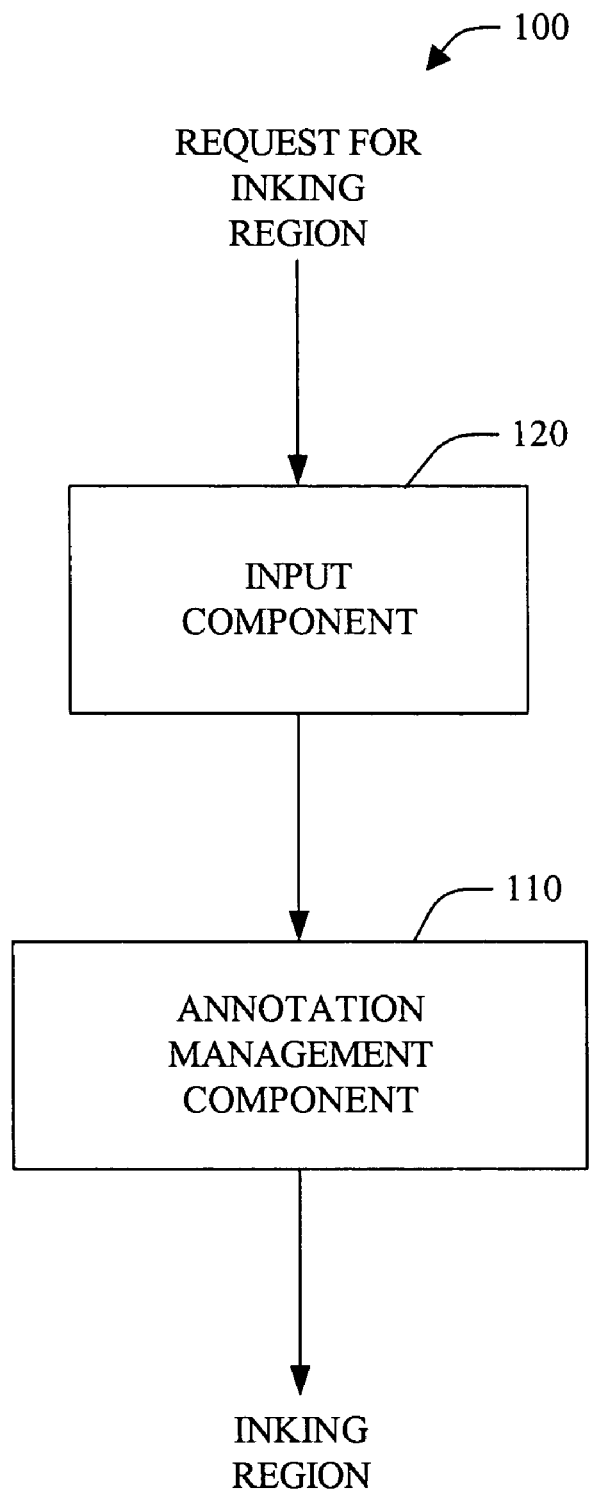
FIG. 1 illustrates an exemplary system that facilitates electronic document annotation.

The present invention provides systems and methods that facilitate annotating digital documents (e.g., word processing documents, images, etc.) displayed by microprocessor-based devices such as desktop computers, Tablet PCs, PDAs, cell phones, and the like. The systems and methods provide a focus plus context-based interface that enables multi-scale navigation during document annotation. This interface zooms a region of an underlying document, wherein a user can enter annotations in the region at a size comfortable to the user and suitably scaled to the device display.

In addition, the zoom interface is fluidly placed and adjusted with respect to the underlying document and the user's writing tool via various scale-space framework-based techniques, wherein the zoom region can automatically adjust in location, size, and shape, for example, while the user annotates in order to provide an experience that resembles annotating physical paper. When the zoom region scales back to page size, annotations scale to an appropriate size based on the underlying document. These novel features provide advantages over conventional techniques that do not contemplate multi-scale navigation during document annotating.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "device" are intended to refer to a computer-related entity, either hardware, a combination of hardware and software, software, or software in execution. For example, a component can be, but is not limited to, a process running on a processor, a processor, an object, an executable, a thread of execution, a program, and/or a computer. By way of illustration, both an application running on a server and the server can be a computer component. In addition, one or more components can reside within a process and/or thread of execution, and a component can be localized on one computer and/or distributed between two or more computers. Furthermore, a component can be an entity (e.g., within a process) that an operating system kernel schedules for execution. Moreover, a component can be associated with a context (e.g., the contents within system registers), which can be volatile and/or non-volatile data associated with the execution of the thread.

As used in this application, the terms "inking," "digital inking," "annotating" "digital annotating," and variants thereof can refer to virtually any technique that can be utilized to display and/or perform an action in connection with a document including viewing, navigating, editing, adding comments, adding notes, changing format, and/or correcting punctuation and grammar, for example.

FIG. 1 illustrates a system 100 that facilitates digital inking. The system 100 comprises an annotation management component 110 that generates inking, or annotation regions and an input component 120 that conveys requests for inking regions to the annotation management component 110. In general, the system 100 can be employed with virtually any microprocessor-based device and in connection with essentially any user interface (e.g., text and graphics) executing therein. For example, the system 100 can be utilized with word processors to modify word processing and/or image documents.

When employed with a user interface, the annotation management component 110 can generate at least one inking region (e.g., editable text/graphics) for the user interface. The annotation management component 110 can be invoked by the input component 120 when the input component 120 receives a request to generate an inking region via an action, a sound, a button press, a mouse click, and/or automatically, as described in detail below. Once generated, a user can employ the inking region to add an annotation to a document. For example, the user can employ an input device such as a digital pen, keyboard, touch-screen, voice, mouse, etc. to add free form text and/or graphics to the inking region. Once an annotation is entered in the inking region, it can be edited, removed and/or accepted. In addition, a previously generated inking region can be re-activated, wherein additional annotations can be added and/or existing annotations can be edited and/or removed.

It is to be appreciated that the inking region can be suitably scaled so that the user can add annotations that are relatively similar in size to the document information. For example, where the user is adding free form annotations (e.g., via a digital pen) to a text document, the inking region can zoom existing document information that is presented within the inking region so that the user can comfortably add annotations that are approximately similar in size, if desired. Thus, when a document is displayed such that a user is unable to add annotations or it is difficult to add annotations similar in size to the existing document information, the present invention provides a novel scaling technique that enables the user to add annotations similar in size to the existing document information, if desired. Additionally, the user can add annotations smaller or larger in size than the existing document information, if desired.

Moreover, the inking region can be manually and/or automatically re-positioned and/or re-sized relative to the document to enable the user to add annotations essentially anywhere on the document. Such changes to the inking region can occur prior to, concurrently with and/or after annotating. Thus, the present invention provides a novel technique for multi-scale navigation before, during and after annotating. As described in detail below, various navigation techniques that are based on a space-scale framework can be employed in accordance with aspects of the present invention. The foregoing provides an improvement over conventional systems, which do not employ multi-scale navigation during annotating.

Figure 2:
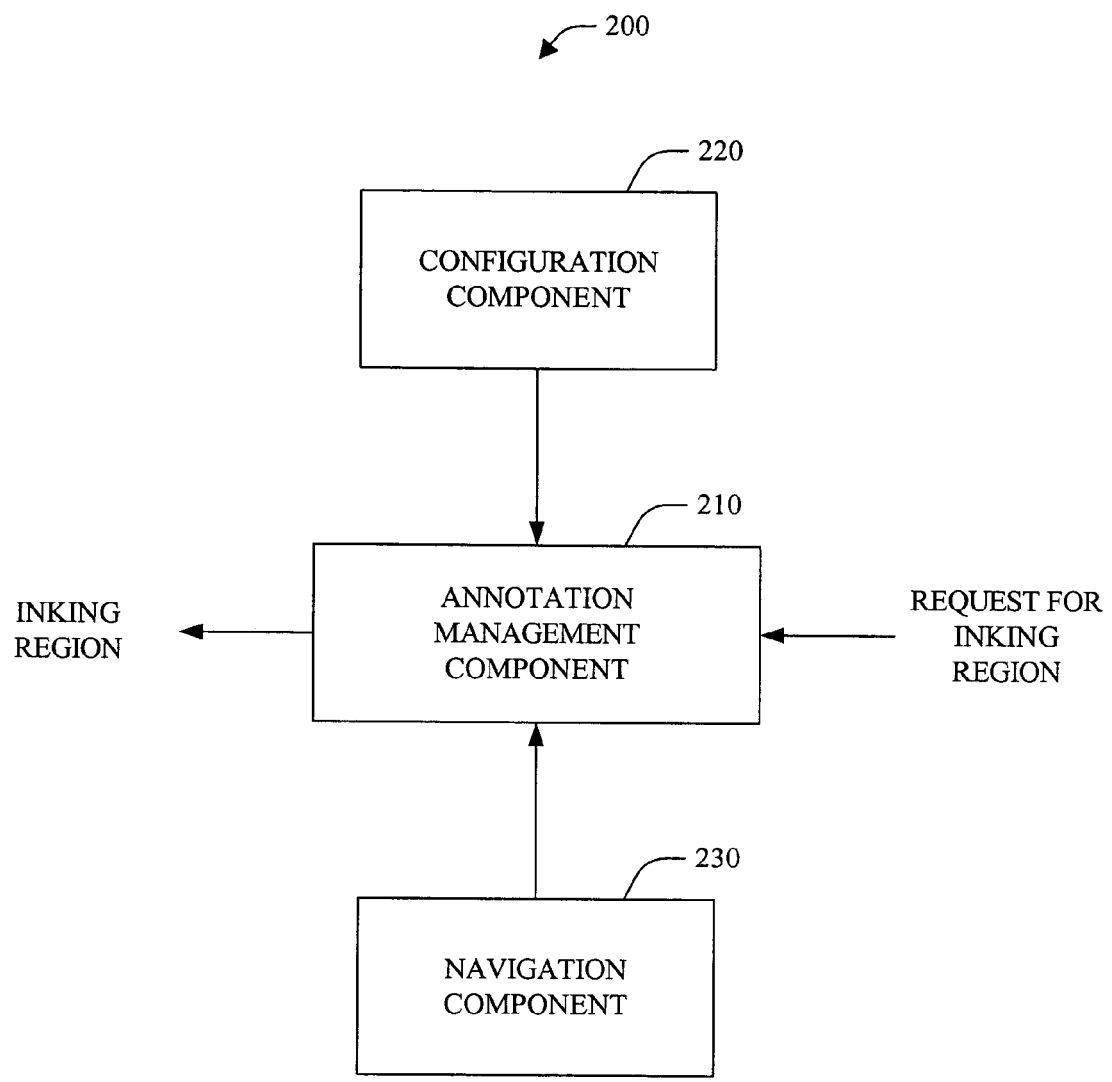
FIG. 2 illustrates an exemplary annotation component that can be employed in connection with various microprocessor-based devices.

FIG. 2 illustrates a system 200 for generating a digital inking region. The system 200 comprises an annotation management component 210 that generates inking regions, a configuration component 220 that provides inking region properties, and a navigation component 230 that provides inking region navigation algorithms.

The annotation management component 210 (e.g., annotation management component 110) can generate at least one inking region for the user interface. Typically, generation and/or deactivation of the inking region is in response to a user request through mechanisms such as an action, a sound, a button press, and/or a mouse click. However, automatic techniques can be employed. Once generated, the inking region can be employed to add one or more annotations to a document. In general, the inking region can be generated such that the user can add annotations that are relatively similar in size to the document information presented within the inking region; however, it is to be appreciated that the user can adjust annotation scaling as a desired. In addition, the inking region can be manually and/or automatically re-positioned and/or re-sized relative to the document to enable the user to add annotations essentially anywhere on the document. When closing an inking region, annotations and document information therein are scaled to document size.

Upon generation, the annotation management component 210 can obtain inking region properties from the configuration component 220. Such properties can include information related to inking region size, shape, location, appearance, etc. In addition, information related to post-generation activities such as activation/deactivation, editing, size, shape, location, appearance and termination can be obtained from the configuration component 220. It is to be appreciated that such information can be provided to the configuration component 220 by a user and/or automatically generated with intelligence.

In addition, the inking region can be generated to occupy a subset of, or an entire viewing area, depending, for example, on the inking region properties provided by the configuration component 220. Thus, the inking region can be generated and positioned proximate an area of interest such that the user is provided with ample space to view scaled document information and add annotations within the inking region, as well as continue to view remaining portions of non-scaled document information, or portions of the document outside of the inking region.

The navigation component 230 provides algorithms that enable manual and/or automatic re-positioning and/or re-sizing relative to the document in order to allow the user to add annotations essentially anywhere on the document. Such re-positioning and/or re-sizing can occur prior to, concurrently with or after annotating; thus, the present invention provides for multi-scale navigation before, during and after annotating. The algorithms are based on a space-scale framework and include a create space, a move inking region, and a move document algorithm. The space-scale framework is based on geometric relationships between the inking region and the document being annotated.

The create space algorithm automatically re-sizes and re-positions the inking region as the user annotates the document. Typically, the inking region automatically changes shape to create space as the user annotates near the edge of the inking region. This can be achieved by extending the inking region while fixing a mapping between a source plane and a zoom plane and by moving the inking region center to a new center, wherein the inking region remains under the pen, but provides more space to continue annotating. This approach provides for a smooth transition that does not disrupt the user's annotating experience.

The move inking region algorithm moves the inking region relative to the underlying document during annotation. In general, when the inking region is generated, an inking region center is locked. When the inking region is dragged to a new location, the inking region center and a source center concurrently move and a new zoom origin is generated. The foregoing ensures that a user can zoom any point in the underlying document as the inking region is moved from location to location.

The move underlying document algorithm moves the document being annotated relative to the inking region. With this approach, portions of the document that are displayed within the inking region are determined by moving the document rather than the inking region. In general, the inking region center is locked such that the inking region remains fixed with respect to the surrounding document context. When a user can move a source center to a new location, a new inking region origin is generated. This approach ensures that the user can zoom any point in the underlying document by dragging the source window instead of the inking region.

Figure 3:
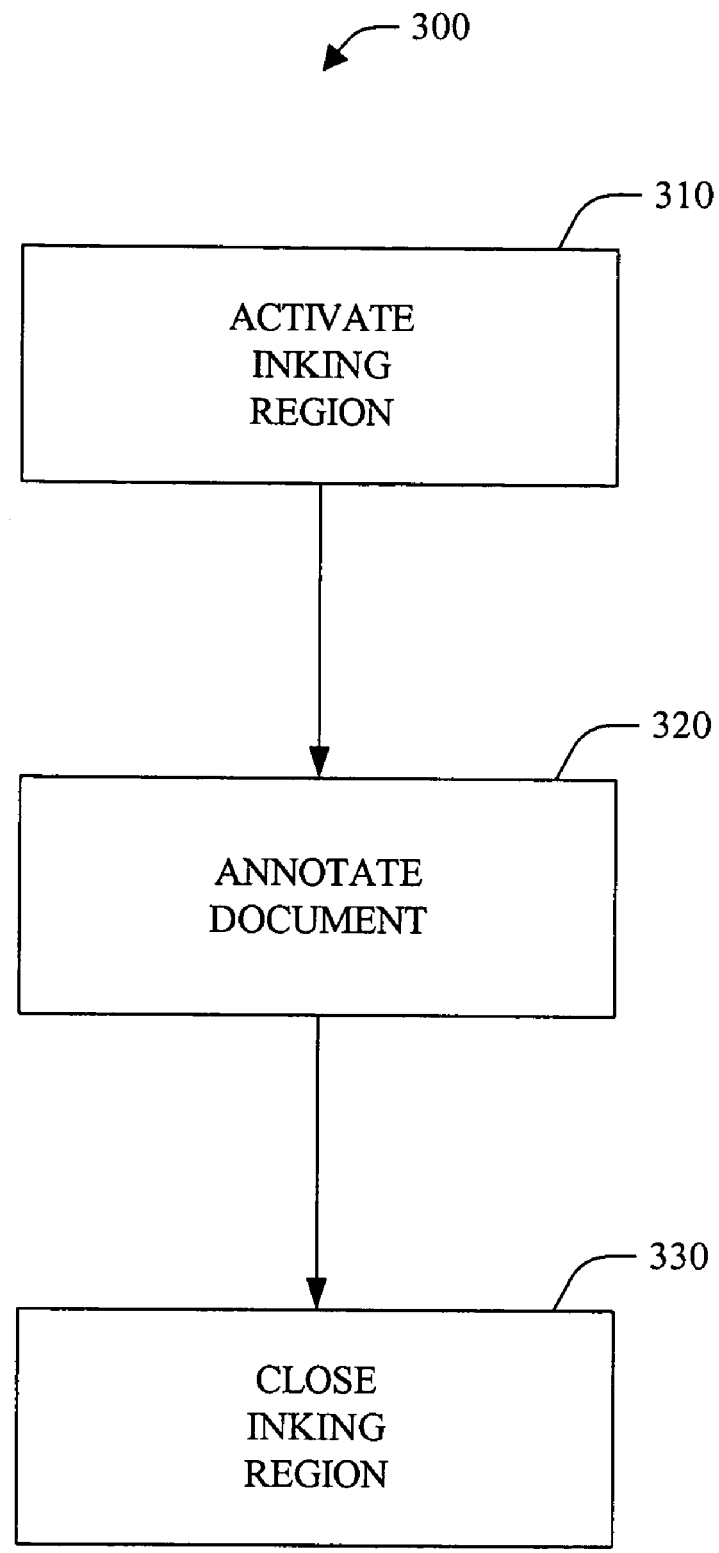
FIG. 3 illustrates an exemplary methodology that employs an interactive zoomable user interface to facilitate document annotation.
Figure 4:
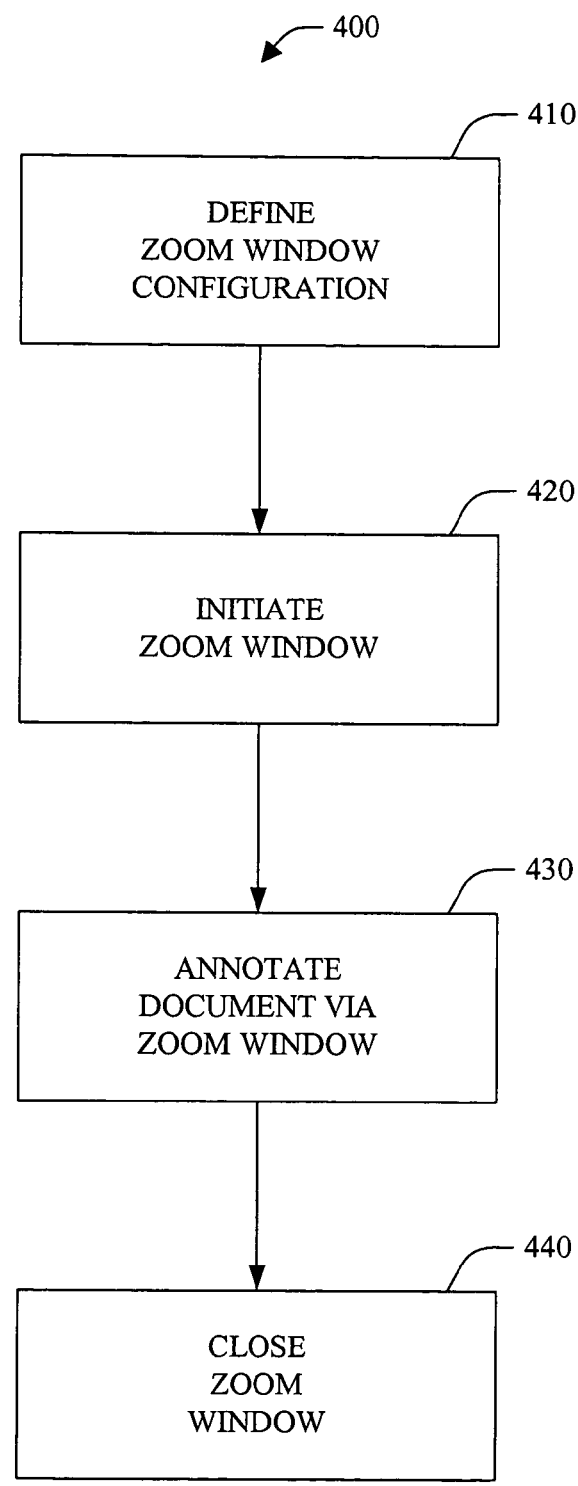
FIG. 4 illustrates an exemplary methodology that facilitates document annotating via a zoom window.

FIGS. 3-4 illustrate document annotation methodologies 300 and 400 in accordance with the present invention. For simplicity of explanation, the methodologies are depicted and described as a series of acts. It is to be understood and appreciated that the present invention is not limited by the acts illustrated and/or by the order of acts, for example acts can occur in various orders and/or concurrently, and with other acts not presented and described herein. Furthermore, not all illustrated acts may be required to implement the methodologies in accordance with the present invention. In addition, those skilled in the art will understand and appreciate that the methodologies could alternatively be represented as a series of interrelated states via a state diagram or events.

Referring initially to FIG. 3, a methodology 300 that facilitates annotating a document with microprocessor-based devices is illustrated in accordance with an aspect of the present invention. At reference numeral 310, an inking region, or zoom window is activated (e.g., by the system 100). In one aspect of the present invention, the inking region can be activated via a digital pen. For example, a user employing a digital pen can indicate a zoom origin within a viewable area of a display by tapping at a point on the display. The inking region can be generated proximate this zoom origin, as described in detail below, and provides a magnified view of the document lying below the zoom window that defines an editable region wherein the user can add text and/or graphics (e.g., comments) over the underlying document. It is to be appreciated that in other aspects of the present invention, activation can be achieved via other means such as voice, mouse, and/or automation.

It is noted that animation can be employed to generate the inking region. For example, animation can be utilized that makes it appear that the inking region grows out of the page. Other suitable animation techniques include box (in and out), blind (horizontal and vertical), checkerboard (across and down), cover (left, right, up, down and diagonal), cut, dissolve, fade, split (horizontal and vertical), wipe (left, right, up and down), uncover, and the like, and/or any combination thereof. In addition, it is noted that a default inking region orientation, shape, size, location, etc. can be pre-defined or automatically generated. Moreover, inking region characteristics can be manually and/or automatically changed at any time.

After the inking region is generated, at 320 the user can annotate the underlying document via the inking region. In one aspect of the present invention, the user can annotate the document via writing within the inking region. For example, the user can utilize a digital pen or a mouse. In other aspects of the present invention, voice and/or a keyboard can be employed to write within the inking region. It can be appreciated that the zoom factor for the inking region can be selected to approximately match the user's natural writing size. Such selection can entail utilizing an iterative approach wherein the factor is refined until it approximately matches the user's natural writing size and/or via an intelligence-based approach wherein the user's writing is stored, analyzed and utilized to automatically refine the factor.

The inking region can be utilized to annotate similar and/or disparate regions of the document by moving the inking region to desired locations. Various algorithms, as described in detail below, can be utilized to move the inking region. These algorithms include: activating other inking regions at various locations of the document; closing the inking region and activating another inking region at a different location; moving (e.g., dragging and cut-and-paste) the inking region, moving the document while the inking region remains fixed; and automatically moving the inking region and adjusting its size during annotating.

At reference numeral 330, the user can accept annotations and close the inking region. In one aspect of the invention, acceptance can be indicated similarly to activating the inking region. For example, the user can tap on an inking region or the document, provide a voice command and/or automatically close it. It is noted that the above animation techniques can be utilized during accepting the annotation. When an inking region is closed, the document contents as well as the annotations can scale to a size consonant with the underlying document. Thus, it appears that the user annotated the document at a size correlated to underlying document content. In other aspects of the invention, annotation scaling can differ in order to refine annotation size with respect to the document information.

FIG. 4 illustrates an exemplary methodology 400 that facilitates electronic document annotating via a zoom window, in accordance with an aspect of the present invention. At reference numeral 410, default configurations for zoom window, or inking region generation can be defined for one or more users. As described in connection with the system 200, such configurations relate to properties that determine zoom window size, shape, location, appearance, activation/deactivation, editing and/or termination. Where a single default configuration is utilized, the configuration can be retrieved whenever a request for a zoom window is received. Where a plurality of default configurations are generated, a configuration associated with a particular user can be obtained from the plurality of configurations based on user information such as logon, password, application, machine address, etc. This retrieved configuration can provide zoom window properties and characteristics such as size, orientation, direction and position, for example. For example, the configuration can be utilized to generate a zoom window in accordance with the manner in which the English language is normally written, or the zoom window can be generated as a horizontal box suitable for accepting annotations in a left to right manner.

In addition, the configuration can be utilized to offset the zoom window from the zoom origin in order to facilitate left to right annotating. For example, the configuration can be set such that 70% of the zoom window resides to the right of the zoom origin. It is to be appreciated that other configurations may be implemented, for example, a vertical orientation to annotate side margins or a horizontal window generated such that the majority of the zoom window resides to the left of the zoom origin to facilitate right-to-left annotating.

At 420, a user can initiate creation of the zoom window as described herein, and based on an associated configuration. It is to be appreciated that in various aspects of the present invention, default configurations can be fully or partially overridden. For example, methodology 400 provides for an alternative mechanism to define the desired zoom window orientation. In one instance, the user can employ a digital pen in a particular direction or shape that is indicative of an orientation. For example, after indicating that a zoom window should be generated, the user can move the pen in a left to right direction to indicate that the zoom window should be generated with a left to right orientation. Similarly, the user can move the pen in a top to bottom direction to indicate that the zoom window should be generated with a top to bottom orientation. It is to be appreciated that virtually all of the default configurations can be overridden. It is further noted that zoom window creation can still be activated by tapping the pen, a voice command or other means, but that subsequent pen activity can provide the information that determines zoom window properties and characteristics.

At reference numeral 430, the user can annotate the underlying document via the zoom window as described herein. It is noted that the above technique can be utilized to move the zoom window during annotation, move the zoom window in accordance with the zoom window orientation. Thus, a zoom window generated for right-to-left annotating moves and/or grows in a right to left direction. In addition, this orientation can be changed while annotating; thus, any movement and/or growth can likewise be changed. For example, the user can activate a zoom window in a top to bottom orientation in order to annotate a margin. Then, the user can change the zoom window orientation to a left to right orientation in order to annotate the document contents.

At 440, the zoom window can be closed. As noted above, the document contents displayed in the zoom window as well as any annotations can scale down to a size that corresponds to the document text and/or graphics. Thus, the user can annotate at a comfortable size in an environment that mimics physical paper and pen.

FIGS. 5-8 illustrate an exemplary space-scale framework that can be utilized to facilitate zoom window (inking region) placement and navigation in accordance with an aspect of the present invention. This space-scale technique is based on geometric relationships between a zoom region and the document being annotated, wherein zooming is represented as a projection from a zoom origin O, through a source window S, and onto a zoom window Z, and a scaling factor α is given by Equation 1.

$$\alpha = |Z|/|S|, \quad \text{Equation 1}$$

wherein |Z| and |S| denote the absolute value of the width of the zoom window and source window, respectively. Furthermore, by similar triangles, the center of the zoom window $Z_C$, the center of the source window $S_C$, and the zoom origin O are related by Equation 2.

$$Z_C = O(1-\alpha) + S_C \alpha. \quad \text{Equation 2}$$

In general, this expression holds for any set of points $Z_C$ and $S_C$ lying on a projector line emanating from an origin O. The space of geometric interactions with the system can be expressed in terms of these parameters, wherein, for a given scale factor α, two of these parameters can be varied (two degrees of freedom) while the third is constrained.

Referring initially to FIG. 5, a schematic of a zooming interface 500 is illustrated, in accordance with an aspect of the present invention. The zooming interface 500 comprises a screen 510 with a zoom window (Z) 520 and a source window (S) 520. As depicted, the zoom window (Z) 520 and source window (S) 530 are oriented such that a zoom origin (O) 540, a zoom center ($Z_C$) 550 and a source ($S_C$) 560 are located about the same point within the screen 510. It is noted that the screen 510 is illustrated as a top down view looking into an X-Y plane. However, it is to be appreciated that the screen can lie in any two planes.

FIG. 6 depicts a diagram 600 of the zooming interface 500 from a X-Z plane, relative to the X-Y plane. Illustrated are the zoom origin (O) 540, the zoom center ($Z_C$) 550 and the source ($S_C$) 560 located respectively within an origin plane 610, a source plane 620 and a zoom plane 630. This space-scale diagram shows a mapping between the zoom origin (O) 540, the source window (S) 530, and the zoom window (Z) 520 can be a projection, wherein the planes are spaced such that the projection scales any region on the source plane 620 by the zoom factor α with respect to the zoom origin (O) 540.

Figures 7, 8:
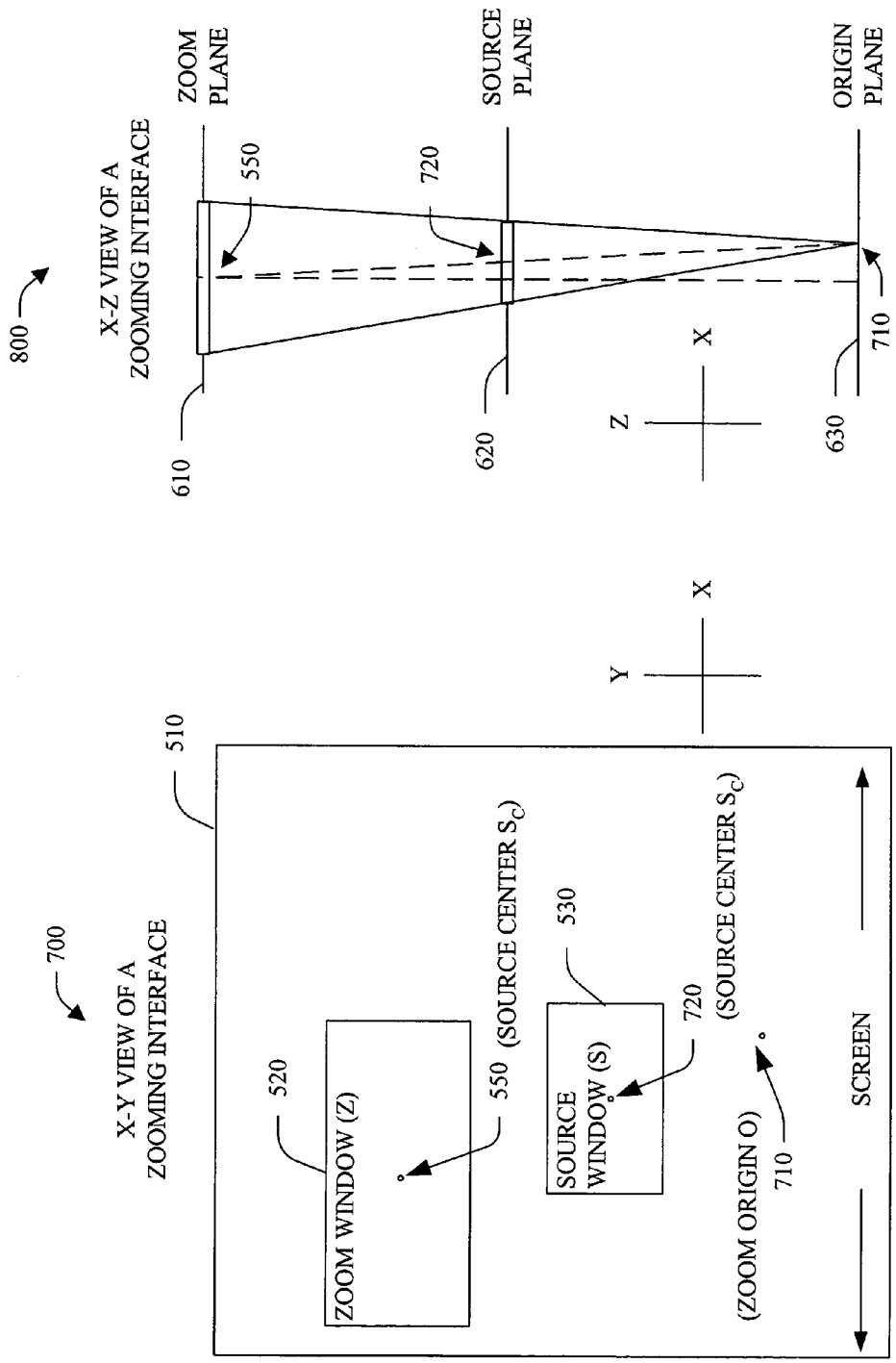
FIG. 7 illustrates an exemplary two-dimensional schematic associated with a space-scale framework.
FIG. 8 illustrates an exemplary one-dimensional diagram associated with a space-scale framework.

FIG. 7 illustrates a schematic 700 from the X-Y plane of the zooming interface 500, wherein the zoom window (Z) 520 and the source window (S) 530 have been re-centered around a zoom origin (O) 710 and a source ($S_C$) 720, respectively. FIG. 8 illustrates a corresponding diagram 800 of the zooming interface 500 from the X-Z plane.

Figure 11:
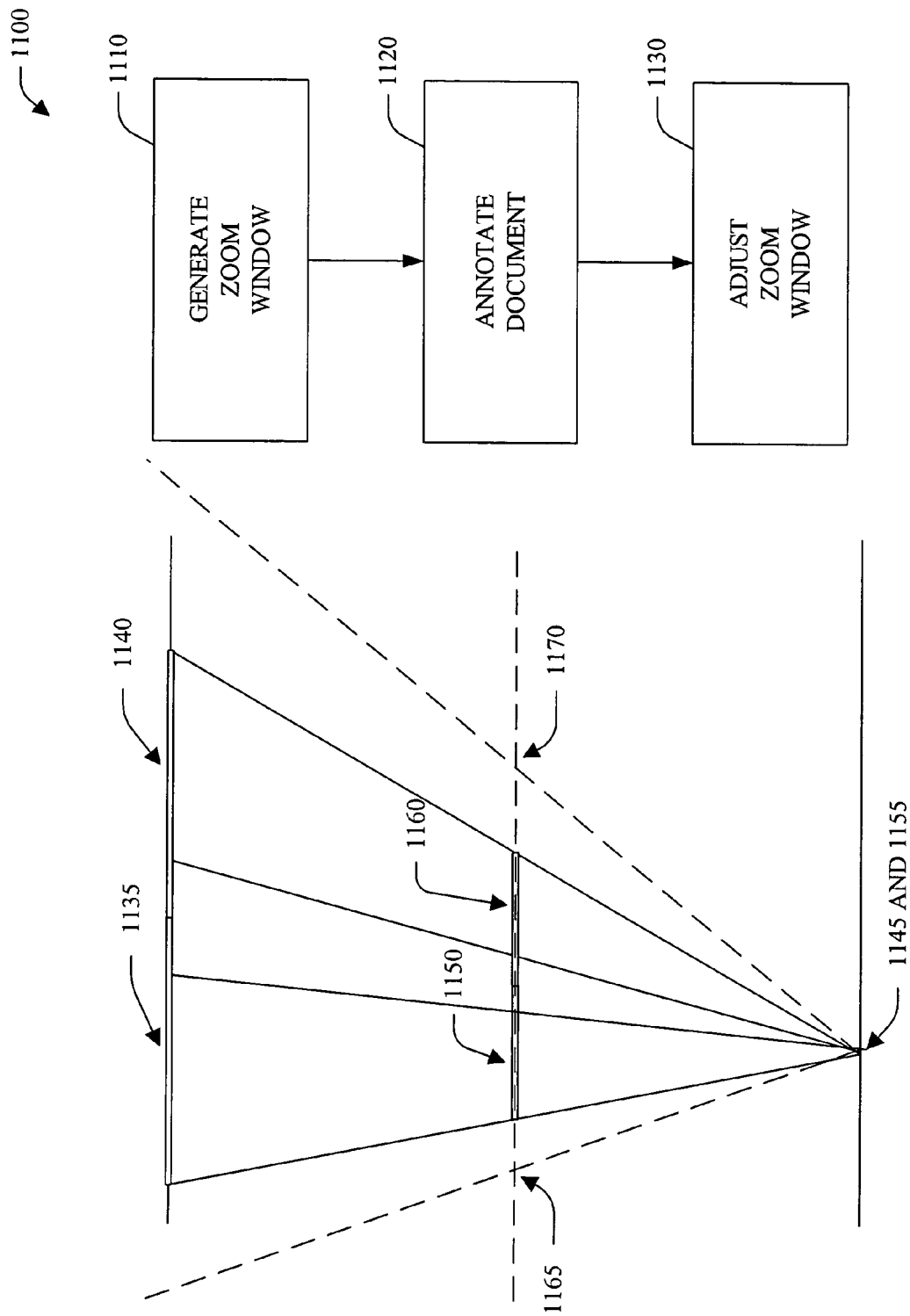
FIG. 11 illustrates a third exemplary annotation methodology.

FIGS. 9-11 illustrate annotation window location and navigation methodologies 900, 1000 and 1100, respectively, in accordance with the present invention. In general, methodologies 900 and 1000 can be referred to as explicit approaches and methodology 1100 can be referred to as an implicit approach. For simplicity of explanation, the methodologies are depicted and described as a series of acts. It is to be understood and appreciated that the present invention is not limited by the acts illustrated and/or by the order of acts, for example acts can occur in various orders and/or concurrently, and with other acts not presented and described herein. Furthermore, not all illustrated acts may be required to implement the methodologies in accordance with the present invention. In addition, those skilled in the art will understand and appreciate that the methodologies could alternatively be represented as a series of interrelated states via a state diagram or events.

Turning to FIG. 9, an exemplary navigation methodology 900 (and corresponding space-scale diagram) that moves a zoom window relative to a document during annotation is illustrated in accordance with an aspect of the present invention. At reference numeral 910, a zoom window is generated as described herein. Once generated, a zoom center (Z) 925 can be locked to a source center (S) 930. At 920, the zoom window can be dragged to a new location. When the user moves zoom center (Z) 925 to a zoom center (Z') 935, the source center (S) 930 concurrently moves to a source center (S') 940 (due to locking zoom center (Z) with source center (S)) and a zoom origin (O) 945 concurrently moves to a zoom origin (O') 950 based on Equation 2 ($Z=O(1-\alpha)+S\alpha$).

It is noted that the initial positions can be referred to as absolute positions of the zoom window with respect to the underlying document and the new positions can be referred to as relative positions with respect to the original absolute positions. Thus, as the user drags the zoom window, the zoom center, source center and source origin are concurrently translated, which ensures that a user can zoom any point in the underlying document as the zoom window is dragged from location to location. At reference numeral 960, the user can employ the zoom window to annotate the new location.

FIG. 10 illustrates an exemplary navigation methodology 1000 (and corresponding space-scale diagram) that moves a document being annotated relative a zoom window, in accordance with an aspect of the present invention. This approach changes the portion of the document that is within the zoom window rather than moving the zoom window. At reference numeral 1010, a zoom window is generated as described herein. Once generated, a zoom center (Z) 1015 can be locked such that a zoom center (Z') 1020 equals the zoom center (Z) 1015. By locking the zoom center (Z) 1015, the zoom window remains fixed with respect to surrounding context. At 1030, a user can drag a source center (S) 1035 to a new source center (S') 1040 (e.g., via a relative pen motion). A zoom origin (O) 1045 moves to a zoom origin (O') 1050 based on Equation 2 ($Z=O(1-\alpha)+S\alpha$). This approach ensures that the user can zoom any point in the underlying document by dragging the source window instead of the zoom window. At reference numeral 1060, the user can employ the zoom window to annotate the new location.

FIG. 11 illustrates an exemplary navigation methodology 1100 (and corresponding space-scale diagram) that automatically re-sizes and positions a zoom window as a user annotates a document, in accordance with an aspect of the present invention. At reference numeral 1110, a zoom window is generated as described herein. At reference numeral 1120, the user can employ the zoom window to annotate the document. At 1130, the zoom window automatically changes shape to create space as the user annotates near the edge of the zoom window.

In one aspect of the invention, this can be achieved by extending the zoom window via moving a zoom center (Z) 1135 to a zoom center (Z') 1140 such that the zoom window remains under the pen and provides more space to continue writing and fixing the mapping between the source plane and zoom plane. This mapping can be fixed by keeping a zoom origin (O) 1145 fixed while allowing a source center (S) 1150 to move. Thus, a zoom origin (O') 1155 is set equal to the zoom origin (O) 1145, given the zoom center (Z') 1140, a source center (S') 1160 can be determined via Equation 2 ($Z=O(1-\alpha)+S\alpha$). With a fixed mapping, users can be provided with access to the entire document or limited to a subset thereof, as depicted by at 1165 and at 1170. This approach provides for a smooth transition that does not disrupt the user's annotating experience.

Figure 12:
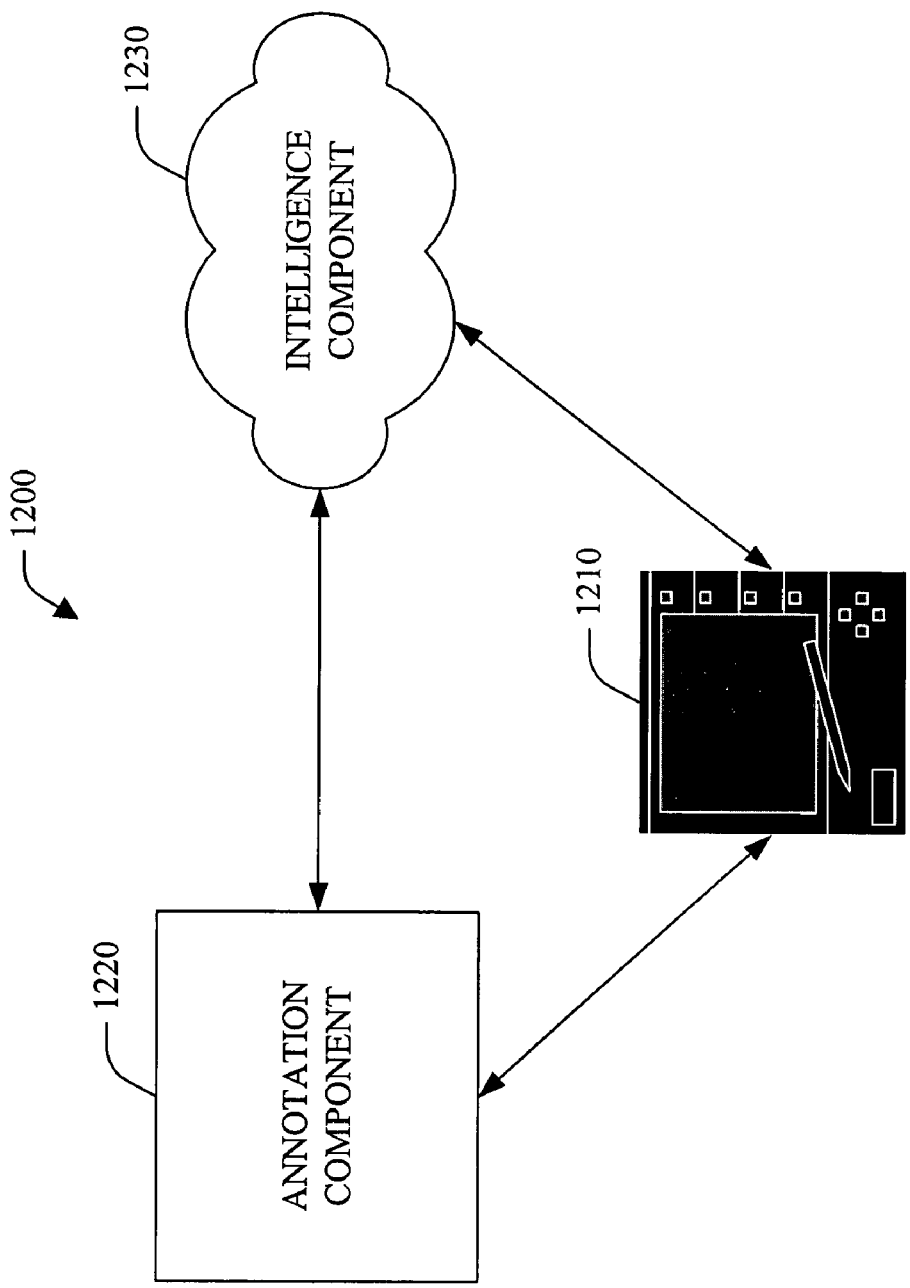
FIG. 12 illustrates an exemplary intelligence based system that facilitates document annotating.

FIG. 12 illustrates an exemplary intelligence based system 1200 that facilitates digital document annotating, in accordance with an aspect of the present invention. The system 1200 comprises a pen-based microprocessor device (device) 1210. The device 1210 includes a graphical user interface (GUI) that can be utilized to view and/or edit documents. As such, the GUI can comprise mechanisms (e.g., input and output) that facilitate communication and/or interaction. For example, the interface can comprise text and/or graphic presenting (e.g., output) regions comprising dialogue boxes, static controls, drop-down-menus, list boxes, pop-up menus, and graphic boxes. The presenting regions can further include utilities to facilitate display. For example, the presenting regions can include vertical and/or horizontal scroll bars to facilitate navigation and toolbar buttons to determine whether a region will be viewable, and to adjust zoom, orientation and/or color/gray scale. A user can interact with the presenting regions to view, select and provide information via various devices such as a mouse, a roller ball, a keypad, a keyboard, a pen and/or voice activation, for example.

Input regions utilized to accept information can employ similar mechanisms (e.g., dialogue boxes, etc.) and, in addition, utilities such as edit controls, combo boxes, radio buttons, check boxes and push buttons, wherein the user can employ various input devices (e.g., the mouse, the roller ball, the keypad, the keyboard, the pen and/or voice activation) in connection with the mechanism and utilities. For example, the user can provide a parameter or variable, or pointer thereto (e.g., a register location) via entering the information into an edit control box and/or highlighting an associated check box. Typically, a mechanism such as a push button is employed subsequent to entering the information in order to initiate conveyance of the information. However, it is to be appreciated that the invention is not so limited. For example, merely highlighting the check box can initiate information conveyance.

The above-noted interface can be utilized by a user to launch a zoom window via activating an annotation component 1220. Such activation can be through a request directly to the annotation component 1220 and/or indirectly to the annotation component 1220 via an intelligence component 1230. The annotation component 1220 can then generate a zoom window for the device 1210 as described above. In addition, an intelligence component 1230 can facilitate zoom window generation. For example, the intelligence component 1230 can provide the annotation component 1210 with zoom window generation information. This information can be based on a user, a document being annotated and/or an application utilized to view the document.

The intelligence component 1230 can further facilitate managing the zoom window during annotating. For example, the intelligence component 1230 can provide information related to the zoom window shape, size, appearance, location, etc. Similar to generation information, this information can also be based on the user, the document being annotated and/or the application utilized to view the document. It is to be appreciated that the intelligence component 1230 can make decisions based on statistics, inferences, probabilities and classifiers (e.g., explicitly and implicitly trained), including but not limited to, Bayesian learning, Bayesian classifiers and other statistical classifiers, such as decision tree learning methods, support vector machines, linear and non-linear regression and/or neural networks.

Figure 13:
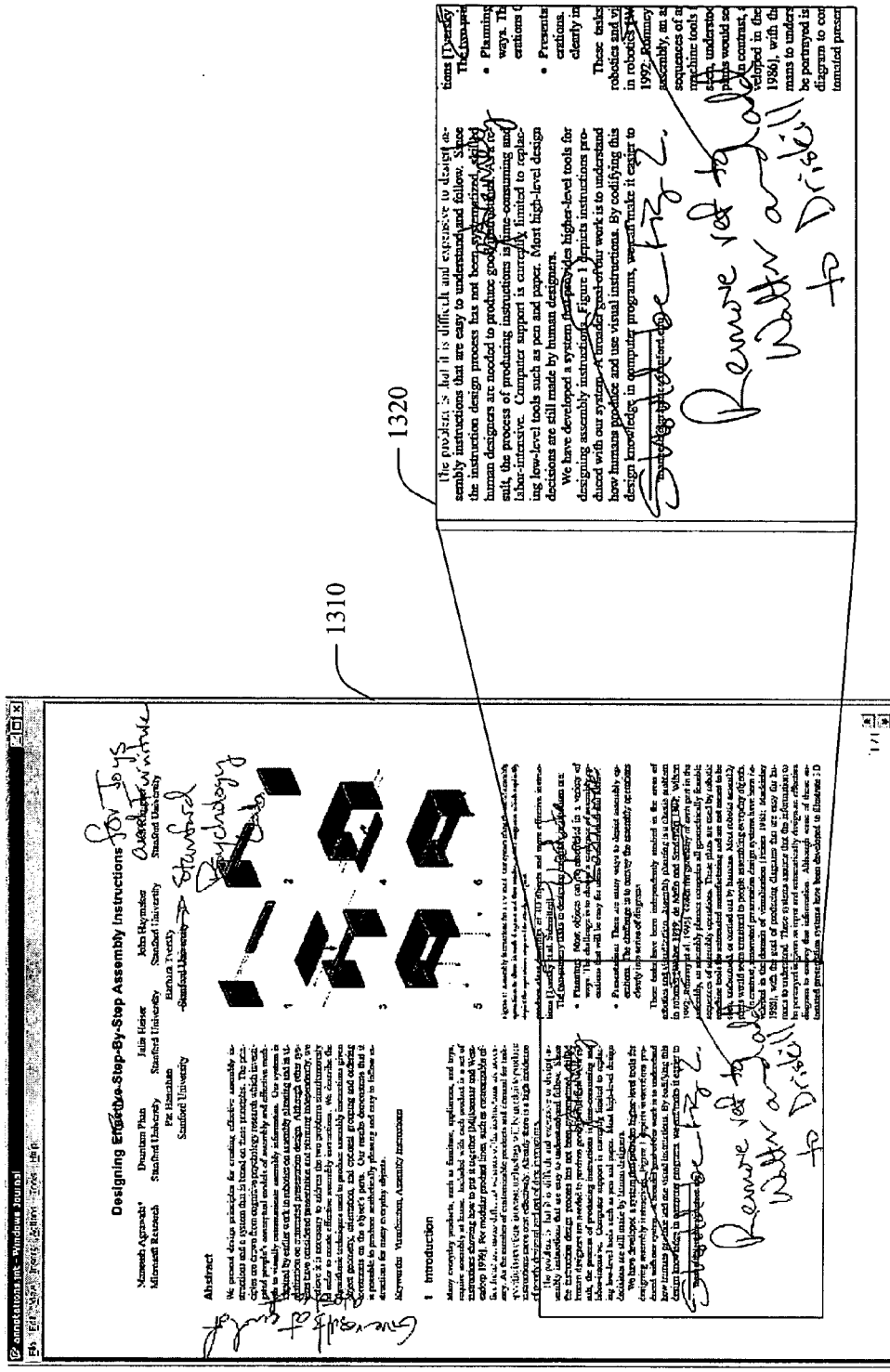
FIG. 13 illustrates various ergonomic limitations of pen computing devices.

FIG. 13 illustrates various ergonomic limitations of conventional pen computing devices. Reference numeral 1310 illustrates a user interface employed to view and annotate a document. The document within the user interface includes text, graphics and various formatting and hand written annotations. Region 1320 shows a magnified portion of the document. As depicted, the annotations within the region 1320 are substantially larger than the type written text in the document, which commonly occurs when annotating with a pen-computing device since the monitor size is typically smaller than a standard sheet of paper. As a result, these annotations created by conventional systems can obscure an underlying document and generally appear clumsy.

Figure 14:
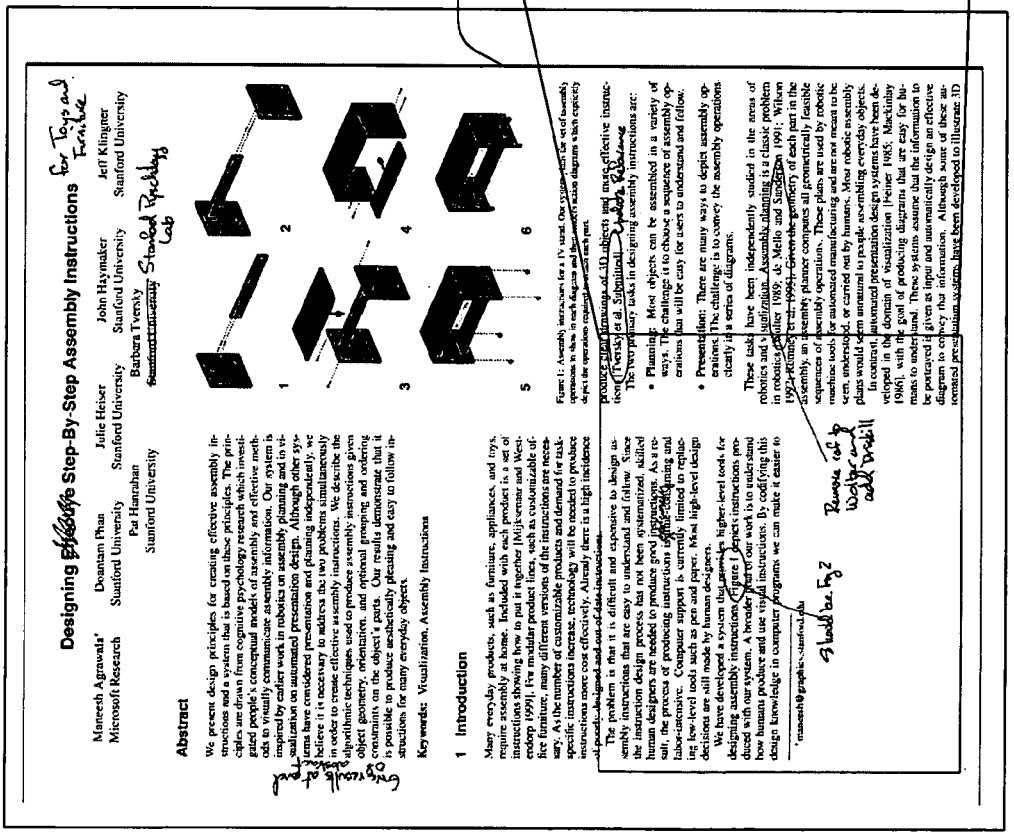
FIG. 14 illustrates an exemplary system that overcomes ergonomic limitations of pen computing devices.

FIG. 14 illustrates a user interface 1410 employing the novel aspects of the present invention to annotate a document. Similar to the user interface 1310, the document within the user interface 1410 includes text, graphics and various formatting and hand written annotations and region 1420 shows a magnified portion of the document. As depicted, the user added annotations within the region 1420 are similar in size to the text within the document, and, thus, the annotations appear as similar to physical pen annotations on a physical document.

Figure 15:
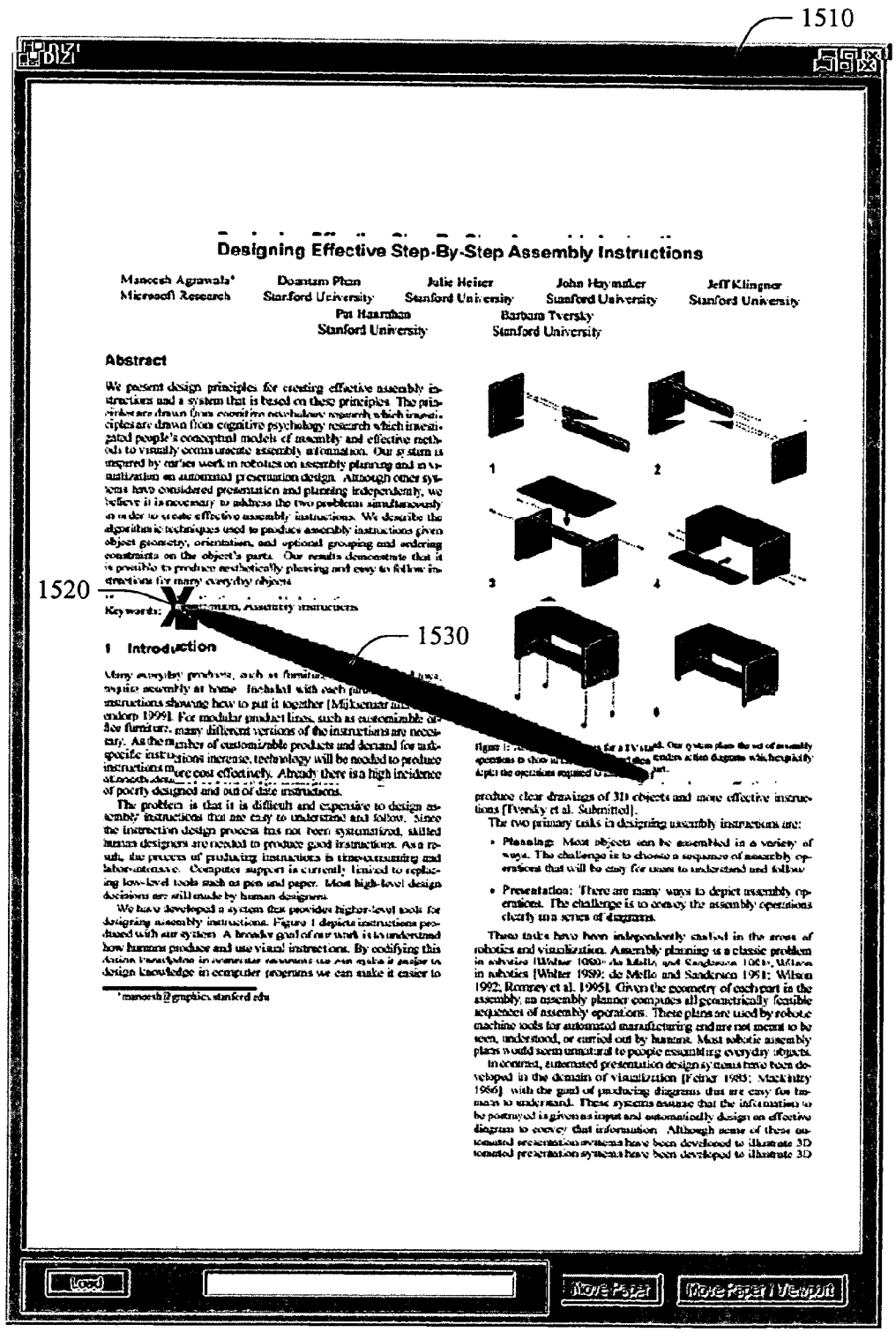
FIGS. 15-17 illustrate utilization of a novel multi-scale navigation zoom window in connection with a user interface.
Figure 16:
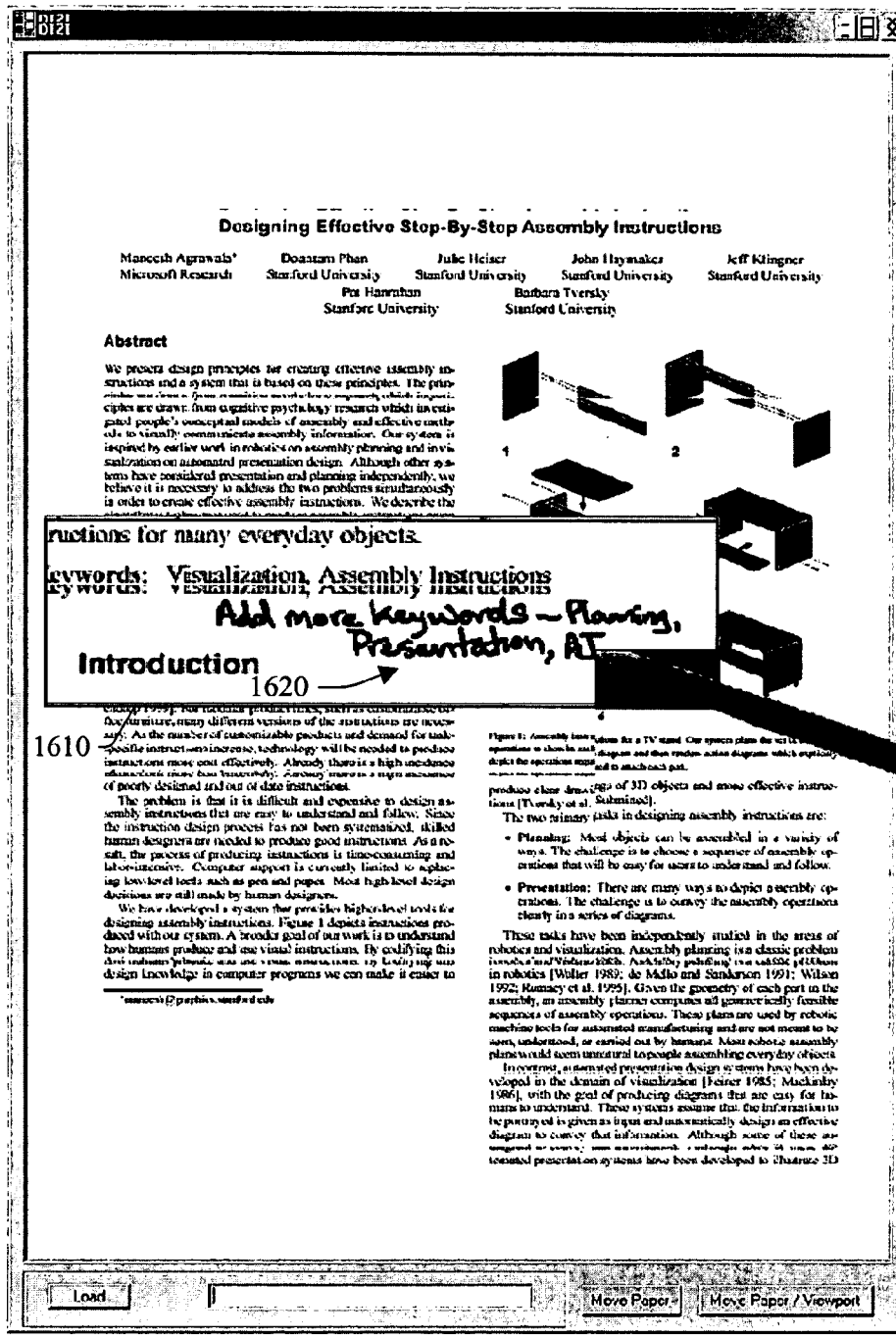

FIGS. 15-21 illustrate a user interface employed in connection with the novel aspects of the present invention to annotate a document. Referring initially to FIG. 15, a user generates a zoom window by indicating a zoom origin 1510 within the user interface 1520. As depicted, the user taps at the zoom origin 1510 within the user interface 1520 with the digital pen 1530. Turning to FIG. 16, a zoom window 1610 is generated around the zoom origin 1520. As noted previously, the zoom window 1610 can be variously shaped and positioned, depending on the properties (a default or user defined configuration) utilized during generation. As depicted, zoom window 1610 is generated as a horizontally rectangular-shaped region positioned such that the majority of region is to the right of the zoom origin 1520. In addition, the document information displayed within the zoom window 1610 is scaled up to allow the user to comfortably add annotations similar in size to the documents information. FIG. 16 additionally shows pen annotations 1620 within the zoom window 1610.

Figure 17:
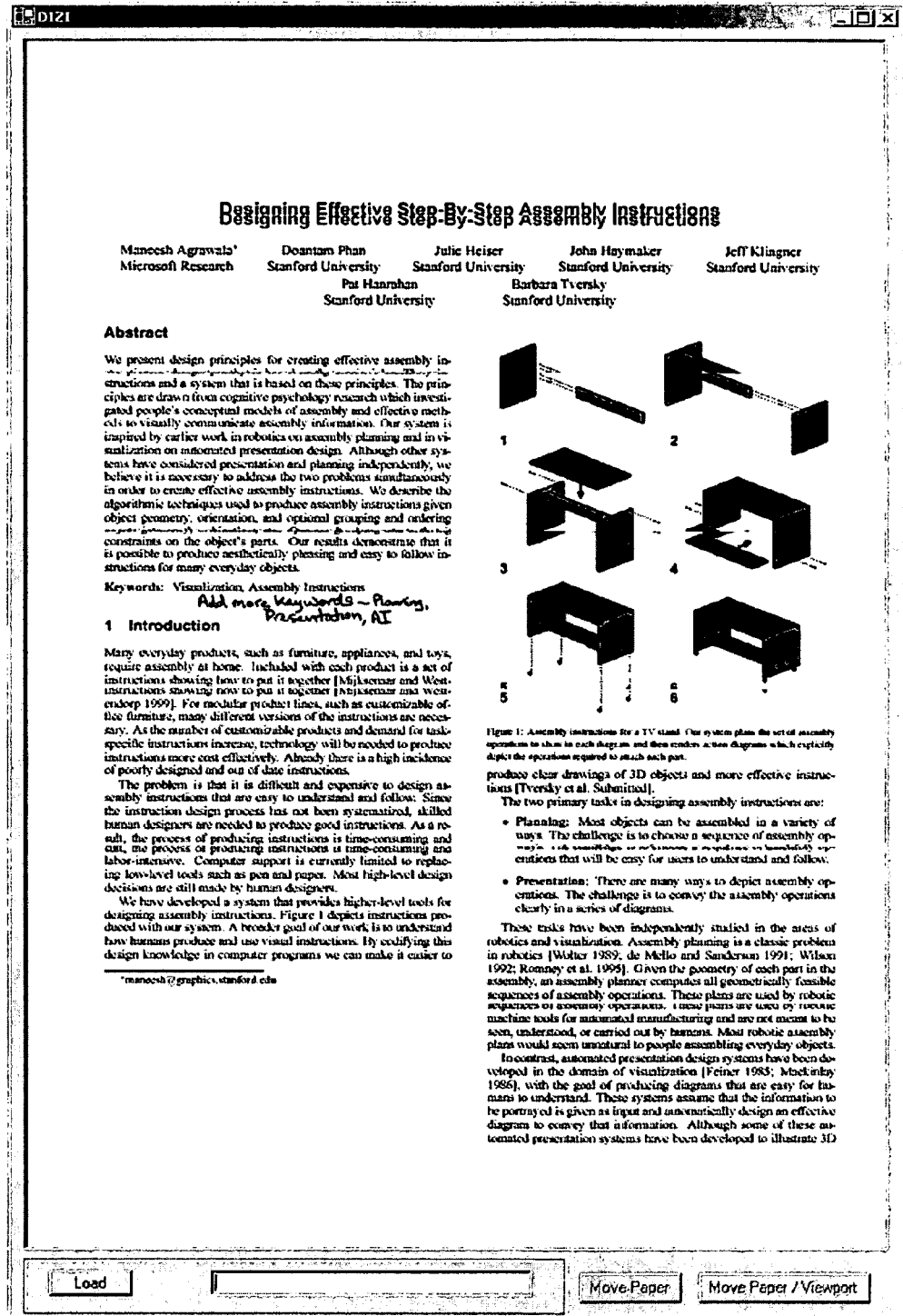
Figure 18:
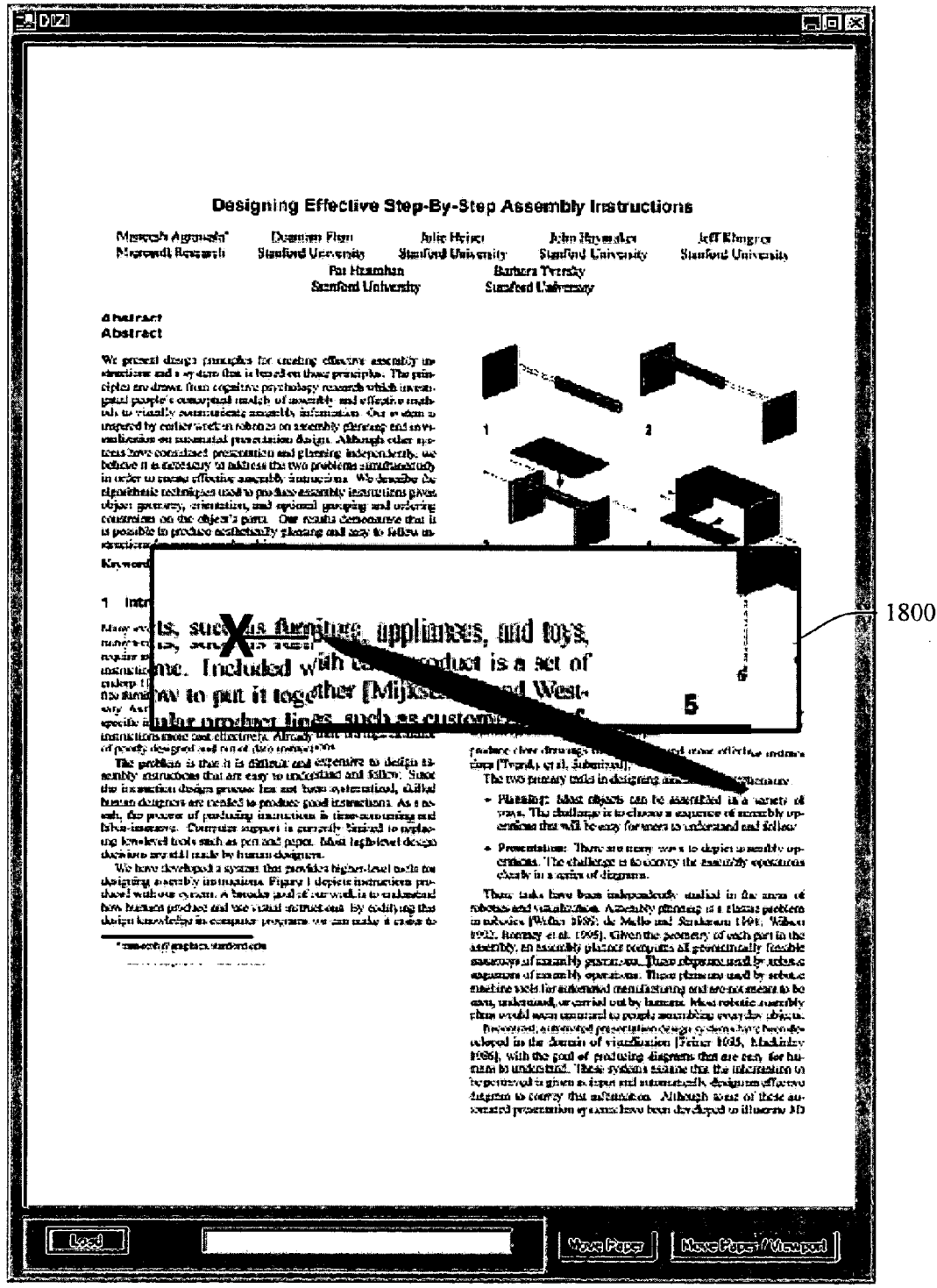
FIGS. 18-21 illustrate various zoom window orientations.
Figure 19:
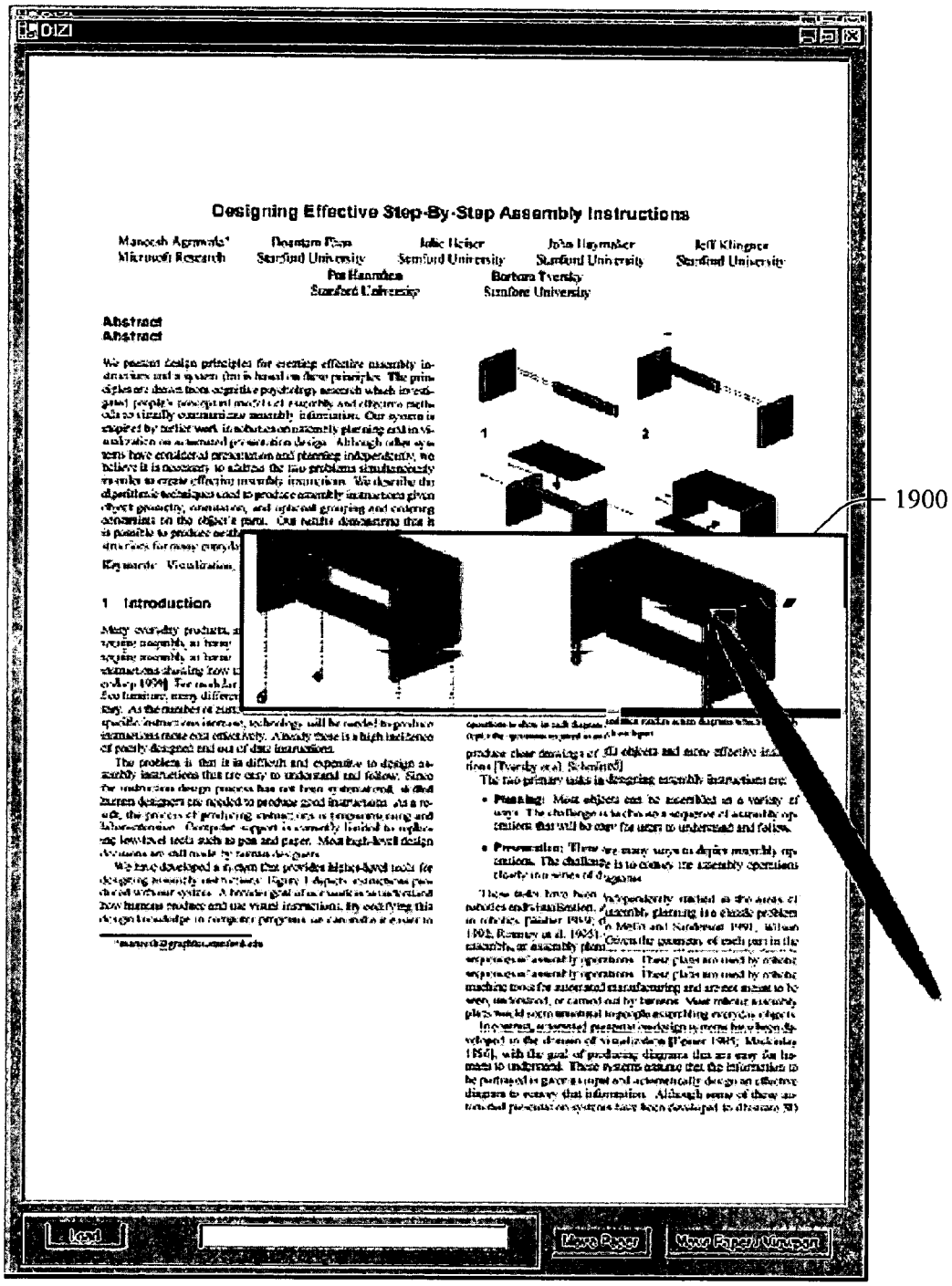
Figure 20:
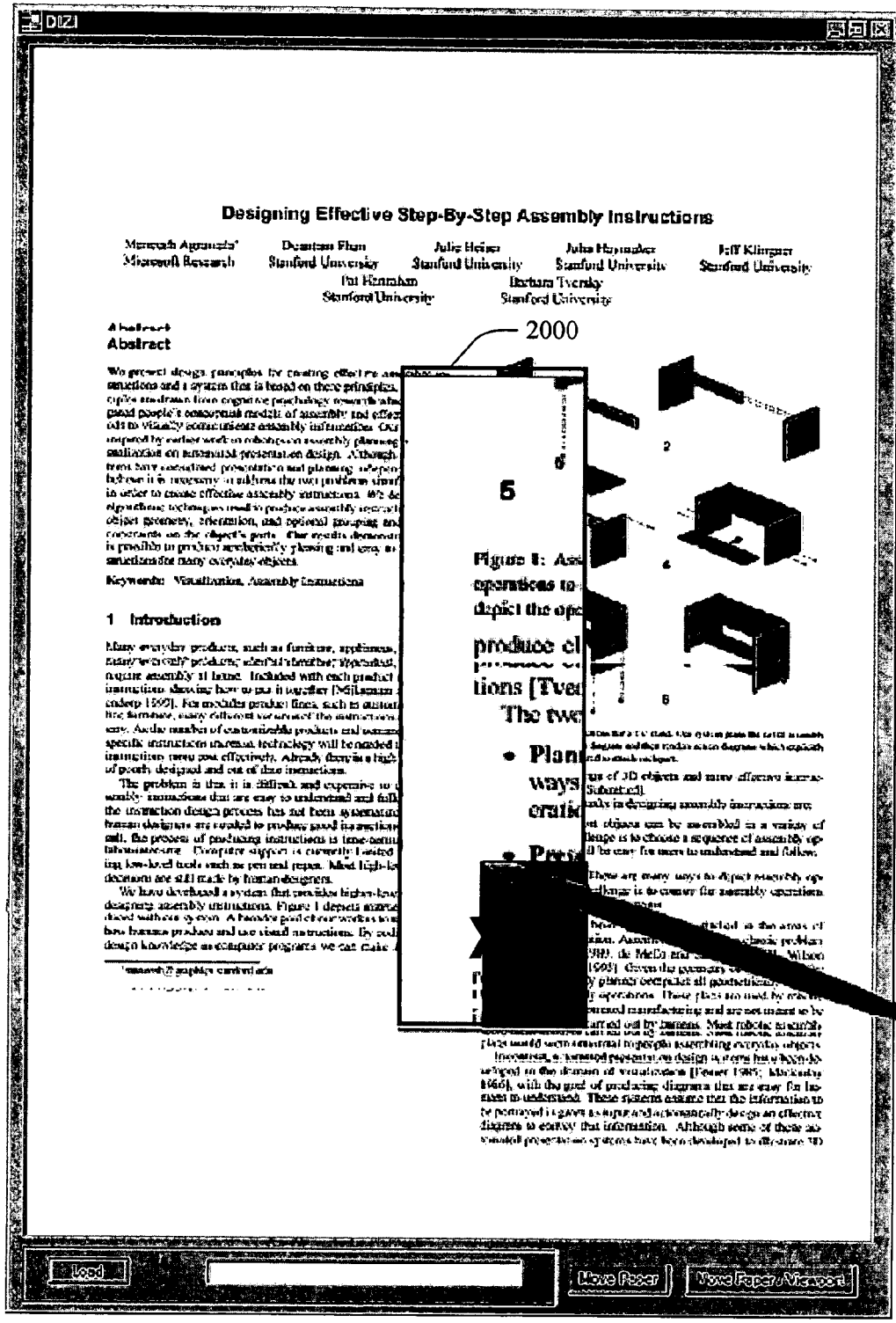
Figure 21:
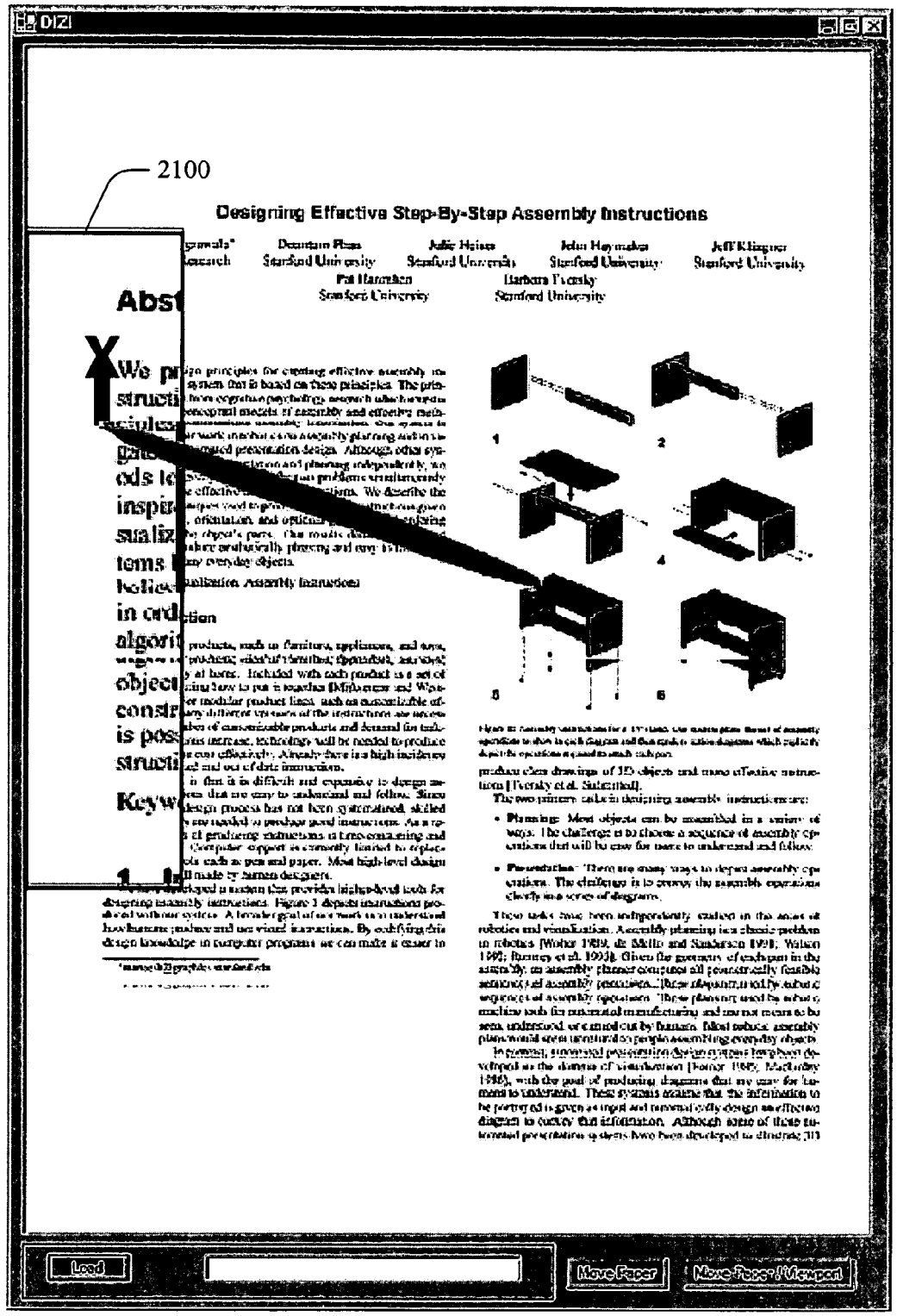

FIG. 17 shows the user interface 1520 after the user closes the zoom window 1610. As noted above, the zoom window 1610 can be closed via tapping the digital pen within the zoom window 1610. FIG. 17 additionally shows that the pen annotations 1620 scale down with the contexts of the zoom window to a size proportional with the document contents. FIGS. 18-21 illustrate other exemplary zoom windows. FIGS. 18 and 19 depict horizontal zoom windows 1800 and 1900, respectively, that are utilized to annotate text and images, respectively. FIGS. 20 and 21 depict vertical oriented zoom windows 2000 and 2100, respectively.

Figure 22:
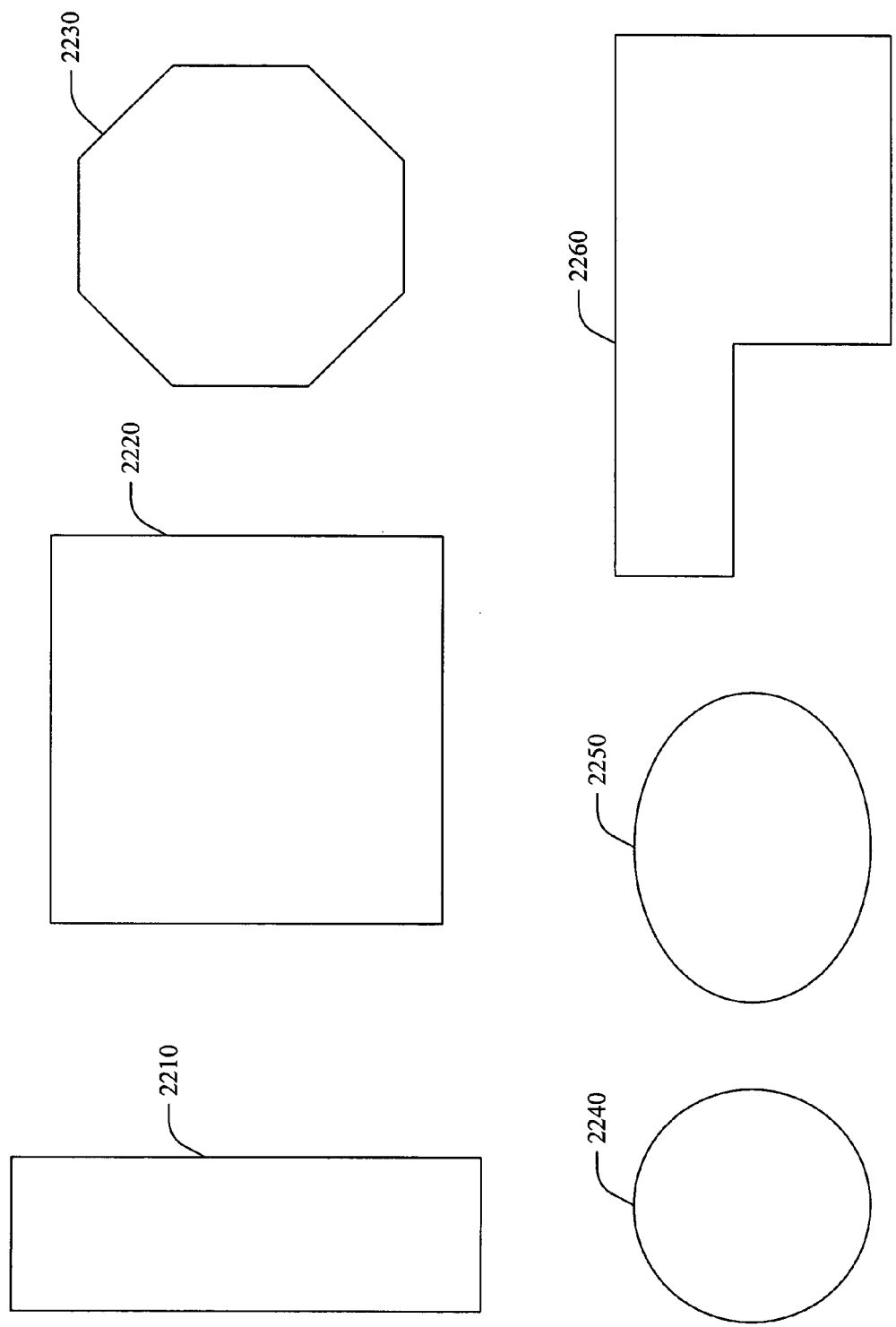
FIG. 22 illustrates various zoom window shapes.

FIG. 22 illustrates various zoom window shapes that can be employed in aspects of the present invention. At 2210, a vertical rectangular zoom window is illustrated. This shape can be generated to facilitate margin annotations and top to bottom writing. At 2220, a square-shaped zoom window is illustrated. At 2230, an octagonal-shaped zoom window is depicted. Reference numerals 2240 and 2250 illustrate circular and elliptical zoom windows, respectively. Reference numeral 2260 depicts an irregular-shaped zoom window.

Figure 23:
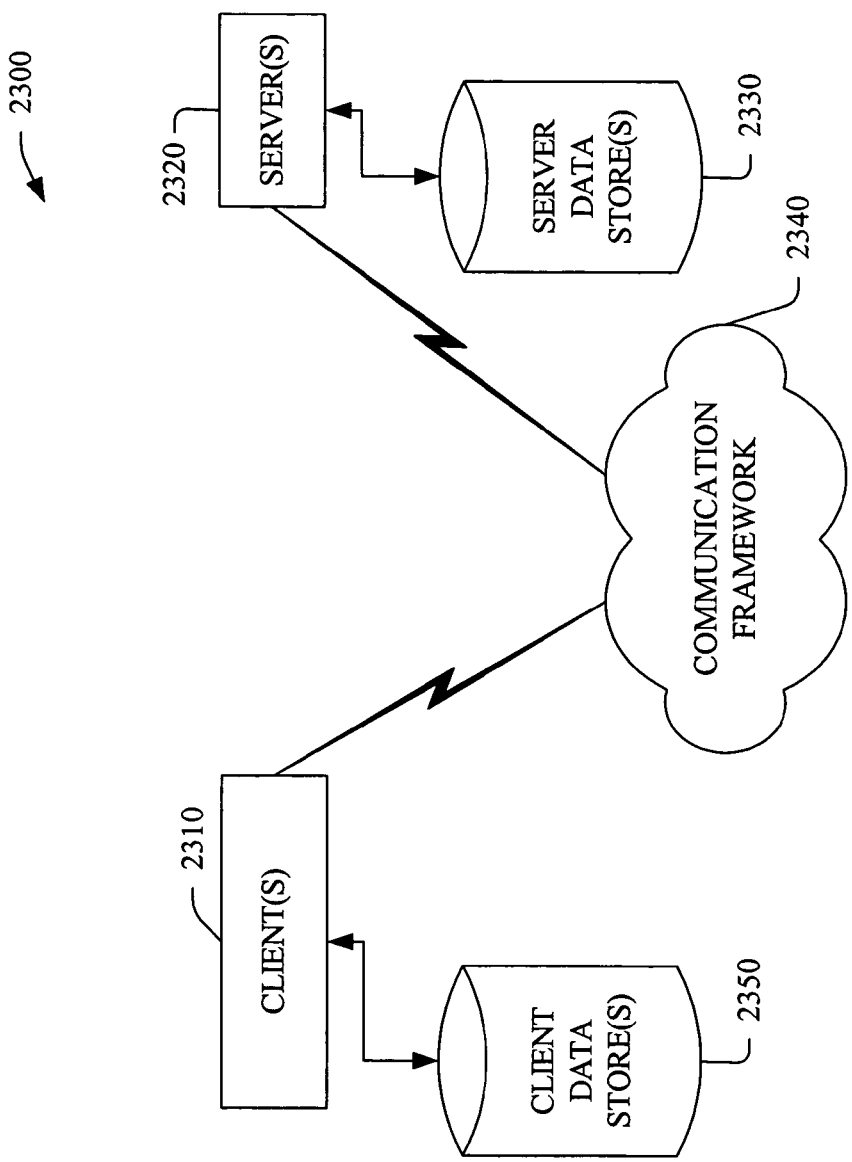
FIG. 23 illustrates an exemplary networking environment, wherein the novel aspects of the present invention can be employed.
Figure 24:
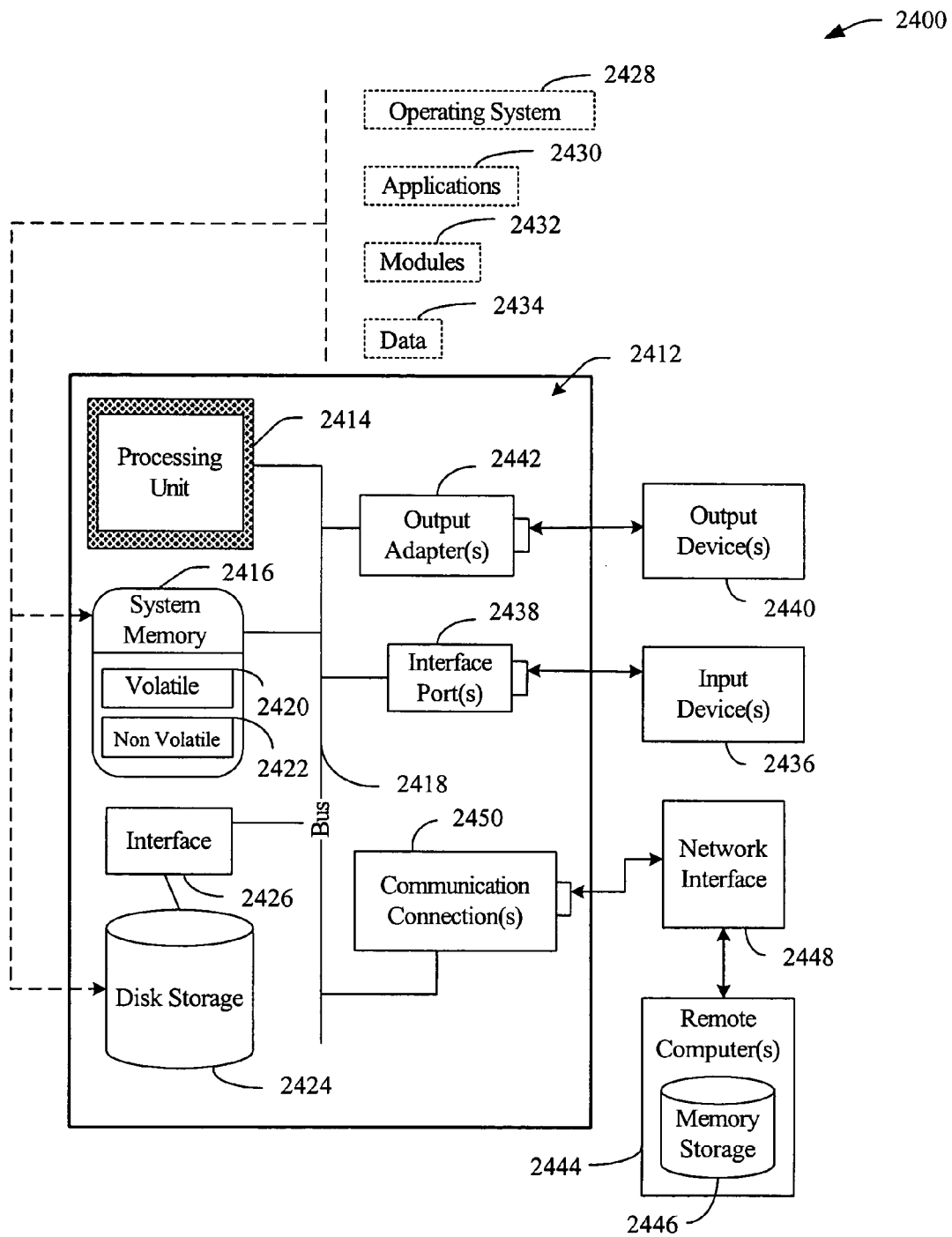
FIG. 24 illustrates an exemplary operating environment, wherein the novel aspects of the present invention can be employed.

In order to provide a context for the various aspects of the invention, FIGS. 23 and 24 as well as the following discussion are intended to provide a brief, general description of a suitable computing environment in which the various aspects of the present invention can be implemented. While the invention has been described above in the general context of computer-executable instructions of a computer program that runs on a computer and/or computers, those skilled in the art will recognize that the invention also can be implemented in combination with other program modules. Generally, program modules include routines, programs, components, data structures, etc. that perform particular tasks and/or implement particular abstract data types.

Moreover, those skilled in the art will appreciate that the inventive methods may be practiced with other computer system configurations, including single-processor or multiprocessor computer systems, mini-computing devices, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

FIG. 23 is a schematic block diagram of a sample-computing environment 2300 with which the present invention can interact. The system 2300 includes one or more client(s) 2310. The client(s) 2310 can be hardware and/or software (e.g., threads, processes, computing devices). The system 2300 also includes one or more server(s) 2320. The server(s) 2320 can also be hardware and/or software (e.g., threads, processes, computing devices). The servers 2320 can house threads to perform transformations by employing the present invention, for example. One possible communication between a client 2310 and a server 2320 can be in the form of a data packet adapted to be transmitted between two or more computer processes. The system 2300 includes a communication framework 2340 that can be employed to facilitate communications between the client(s) 2310 and the server(s) 2320. The client(s) 2310 are operably connected to one or more client data store(s) 2350 that can be employed to store information local to the client(s) 2310. Similarly, the server(s) 2320 are operably connected to one or more server data store(s) 2330 that can be employed to store information local to the servers 2340.

With reference to FIG. 24, an exemplary environment 2410 for implementing various aspects of the invention includes a computer 2412. The computer 2412 includes a processing unit 2414, a system memory 2416, and a system bus 2418. The system bus 2418 couples system components including, but not limited to, the system memory 2416 to the processing unit 2414. The processing unit 2414 can be any of various available processors. Dual microprocessors and other multiprocessor architectures also can be employed as the processing unit 2414.

The system bus 2418 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 2416 includes volatile memory 2420 and nonvolatile memory 2422. The basic input/output system (BIOS), containing the basic routines to transfer information between elements within the computer 2412, such as during start-up, is stored in nonvolatile memory 2422. By way of illustration, and not limitation, nonvolatile memory 2422 can include read only memory (ROM), programmable ROM (PROM), electrically programmable ROM (EPROM), electrically erasable ROM (EEPROM), or flash memory. Volatile memory 2420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 2412 also includes removable/non-removable, volatile/non-volatile computer storage media. FIG. 24 illustrates, for example a disk storage 2424. Disk storage 2424 includes, but is not limited to, devices like a magnetic disk drive, floppy disk drive, tape drive, Jaz drive, Zip drive, LS-100 drive, flash memory card, or memory stick. In addition, disk storage 2424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2424 to the system bus 2418, a removable or non-removable interface is typically used such as interface 2426.

It is to be appreciated that FIG. 24 describes software that acts as an intermediary between users and the basic computer resources described in suitable operating environment 2410. Such software includes an operating system 2428. Operating system 2428, which can be stored on disk storage 2424, acts to control and allocate resources of the computer system 2412. System applications 2430 take advantage of the management of resources by operating system 2428 through program modules 2432 and program data 2434 stored either in system memory 2416 or on disk storage 2424. It is to be appreciated that the present invention can be implemented with various operating systems or combinations of operating systems.

A user enters commands or information into the computer 2412 through input device(s) 2436. Input devices 2436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2414 through the system bus 2418 via interface port(s) 2438. Interface port(s) 2438 include, for example, a serial port, a parallel port, a game port, and a universal serial bus (USB). Output device(s) 2440 use some of the same type of ports as input device(s) 2436. Thus, for example, a USB port may be used to provide input to computer 2412, and to output information from computer 2412 to an output device 2440. Output adapter 2442 is provided to illustrate that there are some output devices 2440 like monitors, speakers, and printers, among other output devices 2440, which require special adapters. The output adapters 2442 include, by way of illustration and not limitation, video and sound cards that provide a means of connection between the output device 2440 and the system bus 2418. It should be noted that other devices and/or systems of devices provide both input and output capabilities such as remote computer(s) 2444.

Computer 2412 can operate in a networked environment using logical connections to one or more remote computers, such as remote computer(s) 2444. The remote computer(s) 2444 can be a personal computer, a server, a router, a network PC, a workstation, a microprocessor based appliance, a peer device or other common network node and the like, and typically includes many or all of the elements described relative to computer 2412. For purposes of brevity, only a memory storage device 2446 is illustrated with remote computer(s) 2444. Remote computer(s) 2444 is logically connected to computer 2412 through a network interface 2448 and then physically connected via communication connection 2450. Network interface 2448 encompasses communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2450 refers to the hardware/software employed to connect the network interface 2448 to the bus 2418. While communication connection 2450 is shown inside computer 2412, it can also be external to computer 2412. The hardware/software necessary for connection to the network interface 2448 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A computer system that facilitates free form digital inking, comprising:
    a pen-based microprocessor device and an application program,
    the application program is recorded on a computer-readable medium and capable of execution by a computer, the application program comprising:
    an input device for activating an inking region within a zoom window;
    an annotation management component that generates the zoom window comprising the inking region for an underlying digital document; and
    a navigation component that manually and automatically re-positions and re-sizes the zoom window and the inking region relative to the digital document, the re-position and re-size of the zoom window and the inking region occurs at least as an annotation of the digital document is entered in the inking region during an annotation event based at least in part on an amount of annotation information entered and displayed in the inking region, the size of the zoom window corresponds to the size of the inking region.

2. The system of claim 1, wherein the annotation management component is invoked to generate the inking region by identifying a point of interest on the digital document by at least one of a manual or an automatic technique.

3. The system of claim 1, wherein the inking region is generated in connection with animation that makes it appear the inking region grows out of the digital document.

4. The system of claim 1, wherein the inking region is generated to cover a subset of the digital document such that the remaining document can be concurrently viewed.

5. The system of claim 1, wherein the inking region magnifies the portion of the digital document within the inking region.

6. The system of claim 5, wherein the magnification factor is defined such that the user inks at a similar size to document information.

7. The system of claim 1, wherein the inking region is closed via one of a digital pen, a mouse, a button, or voice activation.

8. The system of claim 1, wherein inking within the inking region scales down to a size similar to the text within the digital document when the inking region is closed.

9. The system of claim 1, wherein the navigation component employs one or more of a move inking region, a move digital document, or a create space technique to navigate through the digital document.

10. The system of claim 9, wherein the move inking region, move digital document and create space techniques are based on a space-scale framework.

11. The system of claim 10, wherein the space-scale framework defines navigation via the following equation: $Z_X = O(1-\alpha) + S_C \alpha$, wherein $Z_C$ is a zoom center, O is a zoom origin, $\alpha$ is a scaling factor, and $S_C$ is a screen center.

12. The system of claim 11, wherein the scaling factor is defined by: $\alpha = |Z|/|S|$, wherein $|Z|$ is an absolute value of a zoom region and $|S|$ is an absolute value of a source window.

13. The system of claim 1, wherein an orientation of the inking region is determined via moving a digital pen across the document in one of a right-to-left, a left-to-right, a top-to-bottom, or a bottom-to-top manner.

14. A computer-implemented method that provides a zoom window to annotate digital documents with digital ink, comprising:
    activating an inking region within the zoom window via an input device;
    generating the zoom window comprising the inking region to facilitate initiating an annotation event;
    scaling contents displayed in the zoom window;
    manually and automatically re-positioning and re-sizing, by a pen-based computer system, the zoom window and the inking region relative to at least one underlying digital document, the re-positioning and re-sizing of the zoom window and the inking region occurs at least as annotation of the at least one underlying digital document is entered in the inking region during the annotation event as a function of an amount of annotation information entered and displayed in the inking region, wherein size of the zoom window corresponds to size of the inking region;
    positioning the zoom window over an area of interest;
    navigating the zoom window after annotating the at least one underlying digital document; and
    terminating the annotation event after the annotation information is entered in the inking region.

15. The method of claim 14 further comprising scaling down document contents and the annotations displayed in the zoom window to a size corresponding with text in the at least one underlying digital document being annotated.

16. The method of claim 14 further comprising defining a shape and a location of the zoom window via indicating a point in the at least one underlying digital document with at least one of a digital pen, a button, a mouse, or voice activation.

17. The method of claim 14 further comprising animating generation of the zoom window to create an appearance that the zoom window grows out of the at least one underlying digital document.

18. The method of claim 14 further comprising employing a space-scale technique to navigate the zoom window.

19. The method of claim 14 further comprising magnifying the zoom window such that add adding annotations, which are similar in size to document information displayed within the zoom window, is facilitated.

20. A computer system that facilitates electronic document annotating, comprising:
    a pen-based microprocessor device;
    means for activating an inking region within an annotation window;
    means for generating the annotation window comprising the inking region for an underlying electronic document;
    means for defining a location of the annotation window;
    means for magnifying contents of the annotation window;
    means for employing the annotation window to annotate the underlying electronic document; and
    means for manual and automatic re-positioning and re-sizing of the annotation window and the inking region relative to the underlying electronic document, the re-positioning and re-sizing of the annotation window and the inking region occurs at least as an annotation of the underlying electronic document is entered in the inking region during an annotation event based at least in part on a quantity of annotation information entered and displayed in the inking region, wherein size of the annotation window corresponds to size of the inking region.

* * * * *